US010427365B2

(12) United States Patent
Hager et al.

(10) Patent No.: US 10,427,365 B2
(45) Date of Patent: Oct. 1, 2019

(54) HAND TEARABLE SHEETS AND METHOD FOR MANUFACTURING SAME

(71) Applicant: 3M INNOVATIVE PROPERTIES COMPANY, St. Paul, MN (US)

(72) Inventors: Patrick J. Hager, Woodbury, MN (US); Mark A. Strobel, Maplewood, MN (US); Joel A. Getschel, Osceola, WI (US); Shujun J. Wang, Woodbury, MN (US); Adam O. Moughton, Minneapolis, MN (US); Neelakandan Chandrasekaran, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/538,445

(22) PCT Filed: Dec. 23, 2015

(86) PCT No.: PCT/US2015/000231
§ 371 (c)(1),
(2) Date: Jun. 21, 2017

(87) PCT Pub. No.: WO2016/105501
PCT Pub. Date: Jun. 30, 2016

(65) Prior Publication Data
US 2017/0361550 A1    Dec. 21, 2017

Related U.S. Application Data

(60) Provisional application No. 62/096,259, filed on Dec. 23, 2014.

(51) Int. Cl.
*B29D 7/01* (2006.01)
*C08J 5/18* (2006.01)
(Continued)

(52) U.S. Cl.
CPC .................. *B29D 7/01* (2013.01); *B32B 3/02* (2013.01); *B32B 3/263* (2013.01); *B32B 5/142* (2013.01);
(Continued)

(58) Field of Classification Search
CPC ....................................................... B29D 7/01
(Continued)

(56) References Cited

U.S. PATENT DOCUMENTS 4,125,665 A    11/1978 Bemmels et al.
4,152,231 A    5/1979 St. Clair et al.
(Continued)

FOREIGN PATENT DOCUMENTS

WO    WO 01/44398         6/2001
WO    WO-0144398 A1 *  6/2001  ............... B29D 7/01
WO    WO 2015/100319    7/2015

OTHER PUBLICATIONS

Alcock, "The Effect of Processing Conditions on the Mechanical Properties and Thermal Stability of Highly Oriented PP Tapes," European Polymer Journal, 2009, vol. 45, pp. 2878-2894.
(Continued)

*Primary Examiner* — Brent T O'Hern

(57) ABSTRACT

A principal film comprising a first polymeric component wherein the principal film has: (1) first and second major faces; (2) a land portion wherein the principal film is capable of thermally-induced self-forming; and (3) one or more modification zones, each comprising a central portion and a rim portion surrounding the central portion and being surrounded by land portion, wherein the average thickness of each rim portion is greater than the average thickness of the land portion surrounding the modification zone, the average thickness of each central portion is less than the average thickness of the land portion surrounding the modification zone and is greater than zero. Also methods for making such films and articles comprising such films.

24 Claims, 7 Drawing Sheets

(51) Int. Cl.
*C09J 7/22* (2018.01)
*B32B 5/14* (2006.01)
*B32B 7/02* (2019.01)
*B32B 27/06* (2006.01)
*B32B 27/08* (2006.01)
*B32B 27/30* (2006.01)
*B32B 27/32* (2006.01)
*B32B 27/34* (2006.01)
*B32B 27/36* (2006.01)
*B32B 3/02* (2006.01)
*B32B 3/26* (2006.01)
*B29C 48/08* (2019.01)
*B29C 55/12* (2006.01)
*B29C 55/14* (2006.01)
*B29K 23/00* (2006.01)

(52) U.S. Cl.
CPC ............... *B32B 7/02* (2013.01); *B32B 27/06* (2013.01); *B32B 27/08* (2013.01); *B32B 27/302* (2013.01); *B32B 27/32* (2013.01); *B32B 27/34* (2013.01); *B32B 27/36* (2013.01); *C08J 5/18* (2013.01); *C09J 7/22* (2018.01); *B29C 48/08* (2019.02); *B29C 55/12* (2013.01); *B29C 55/143* (2013.01); *B29K 2023/12* (2013.01); *B32B 2270/00* (2013.01); *B32B 2307/516* (2013.01); *B32B 2307/518* (2013.01); *B32B 2307/54* (2013.01); *B32B 2307/582* (2013.01); *B32B 2307/7265* (2013.01); *B32B 2307/73* (2013.01); *B32B 2307/736* (2013.01); *B32B 2405/00* (2013.01); *C08J 2323/12* (2013.01)

(58) Field of Classification Search
USPC .......................................................... 428/43
See application file for complete search history.

(56) References Cited

U.S. PATENT DOCUMENTS

| | | |
|---|---|---|
| 4,167,914 A | 9/1979 | Mladato |
| 4,465,015 A | 8/1984 | Osta et al. |
| 4,581,087 A | 4/1986 | Johnson |
| 4,656,213 A | 4/1987 | Schlademan |
| 4,675,582 A | 6/1987 | Hommes et al. |
| 4,756,337 A | 7/1988 | Settineri |
| 4,757,782 A | 7/1988 | Pullinen |
| 4,825,111 A | 4/1989 | Hommes et al. |
| 4,853,602 A | 8/1989 | Hommes et al. |
| 5,036,262 A | 7/1991 | Schonbach |
| 5,051,225 A | 9/1991 | Hommes et al. |
| 5,072,493 A | 12/1991 | Hommes et al. |
| 5,212,011 A | 5/1993 | Ishikawa et al. |
| 5,804,610 A | 9/1998 | Hamer et al. |
| 6,635,334 B1 | 10/2003 | Jackson et al. |
| 7,037,100 B2 | 5/2006 | Strobel et al. |
| 7,138,169 B2 | 11/2006 | Shiota et al. |
| 7,635,264 B2 | 12/2009 | Strobel et al. |
| 7,980,849 B2 | 7/2011 | Strobel et al. |
| 2004/0070100 A1 | 4/2004 | Strobel et al. |
| 2004/0175527 A1* | 9/2004 | Shiota ............... B29D 7/01 428/43 |

OTHER PUBLICATIONS

Capt, "Morphology Development During Biaxial Stretching of Polypropylene Films," 17th Polymer Processing Society Annual Meeting, 2001, 9 pages.

Dias, "Effect of Chain Architecture on Biaxial Orientation and Oxygen Permeability of Polypropylene Film," Journal of Applied Polymer Science, 2008, vol. 107, pp. 1730-1736.

Phillips, "Structure, Processing, Morphology, and Property Relationships of Biaxially Drawn Ziegler—Natta/Metallocene Isotactic Polypropylene Film," Journal of Applied Polymer Science, 2000, vol. 80, pp. 2400-2415.

Stroud, "Application of Ribbon Burners to the Flame Treatment of Polypropylene Films," Progress in Energy and Combustion Science, 2008, vol. 34, No. 6, pp. 696-713.

Taraiya, "The Diffusion of Oxygen Through Uniaxially and Biaxially Drawn Polypropylene," Journal of Applied Polymer Science, 1990, vol. 41, pp. 1659-1671.

International Search Report for PCT International Application No. PCT/US2015/000231, dated Mar. 18, 2016, 5 pages.

* cited by examiner

HAND TEARABLE SHEETS AND METHOD FOR MANUFACTURING SAME

CROSS REFERENCE TO RELATED APPLICATIONS

This application is a national stage filing under 35 U.S.C. 371 of PCT/US2015/000231, filed Dec. 23, 2015 which claims the benefit of U.S. Provisional Application No. 62/096,259, filed Dec. 23, 2014, the disclosures of which are incorporated by reference in their entireties herein.

FIELD

The present invention relates to hand tearable sheets and other articles (e.g., simple polymeric sheets, adhesive tapes, etc.) and methods for manufacturing such articles.

BACKGROUND

Polymeric sheets and films are used in a wide variety of configurations for a wide variety of purposes including as, for example, protective coverings and wraps, drop cloths, the backing member in adhesive tapes, etc.

Especially for sheets and adhesive tapes used in paint masking, it is required that the sheet or adhesive tape be readily torn by hand in order to provide desired degree of hand applicability and utility. Common masking tapes employ paper backings, which despite having been impregnated with saturants and binders to provide water resistance and stretchability still exhibit undue moisture sensitivity and are difficult to process with water-based coatings. Such tape backings also exhibit moisture instability such as cockling, buckling and shredding in certain operations such as wet sanding. Other common adhesive tape backings are based on polymer films which, while providing good strength, stretch and water resistance, are often difficult to tear easily by hand. In particular, films based on oriented polymers and especially oriented polyolefins are well known as adhesive tape backings, but usually require the use of a cutting blade or knife in order to be used. This is not desirable or of sufficient ease of use for many applications.

It has been found previously (e.g., U.S. Pat. No. 7,037,100 (Strobel et al.)) that using a process of rapidly heating an oriented polymer film wrapped on a tooled cooling roll can produce perforations in the film, allowing it to be readily torn by hand. Such films are thought to perforate due to the differential or localized nature of the heating of the film; the major film surface facing the heat source is exposed to a very high heat flux compared to the opposing surface of the film which is in contact with a cooled tooling roll. In the tooled roll, depressions forming the desired tear pattern act as thermal insulators to allow local specific heating of the corresponding areas of the film above the depressions, which causes the film to open producing perforations. The heat source is most advantageously provided by using an open flame burner which produces a high heat flux. Other heat sources can be used.

It has been known to make, using oriented precursor films that are capable of thermally-induced elastic recovery, films having modification zones comprising a rim portion surrounding a central opening, the modification zones surrounded by a land portion, wherein the thickness of the rim portion is greater than the thickness of the land portion, can be produced. As reported in International Publn. No. 2015/100319 (Strobel et al.), such films, when used as the backing member of adhesive tapes, can provide good unwind and release performance without use of additional release agents and liners, good hand tearability, conformability, etc. Accordingly, such films and the resultant tapes incorporating them as backing members have numerous advantageous uses. However, because the central opening within each modification zone passes completely through the film, such films are inherently permeable.

The need exists for impermeable films and articles incorporating such films (e.g., adhesive tapes) that exhibit good release properties (and thus impart good unwind performance to an adhesive tape made with such films), good conformability, and hand tearability with other desired mechanical properties.

SUMMARY

This invention provides a family of films having surprisingly good hand tearability, good processability, water resistance, liquid impermeability, and conformability. Such films are particularly useful as, for example, protective films and backing films for adhesive tapes and sheets. The present invention provides such films, articles made with such films, and methods for making such films.

In brief summary, an article of the invention comprises a principal film, wherein the principal film:
  (a) comprises a first film-forming polymeric component comprising one or more polymers (e.g., polyolefin, polyester, polystyrene, and polyamide); and
  (b) has: (1) first and second major faces; (2) a land portion wherein the principal film is capable of thermally-induced self-forming; and (3) one or more modification zones. Each modification zone comprises a central portion and a rim portion surrounding the central portion and is surrounded by land portion, wherein the average thickness of each rim portion is greater than the average thickness of the land portion surrounding the modification zone, the average thickness of each central portion is less than the average thickness of the land portion surrounding the modification zone and is greater than zero (i.e., the modification zone is impermeable). The unique set of properties provided by films with this novel configuration makes them well suited for many applications where they can provide many surprising advantages. In some embodiments, the article of the invention is used as the backing of an adhesive tape or sheet. In some embodiments, one or more segments of the principal film have a tear strength of less than about 100 $g_f$/mil-thickness.

In brief summary, methods of the invention comprise:
  (a) providing a precursor member that is capable of thermally-induced elastic recovery and has first and second major faces;
  (b) differentially heating at least one target zone of the precursor member above its relaxation temperature ($T_r$) while maintaining the temperature of the portion of the precursor member surrounding the modification zone at a temperature below its $T_r$ so as to cause dimensional modification of the precursor member within the modification zone such that a portion of the film material in the target zone undergoes thermally-induced elastic recovery and forms a modification zone comprising a central portion surrounded by a rim portion wherein maximum thickness of the rim portion becomes relatively greater and the relative thickness of the central portion decreases without opening completely from the first face to the second face (i.e., perforating the film); and (c) cooling the modification zone to below $T_r$, thereby yielding a principal film having: (1) first and second major faces; (2) a land portion wherein the principal film is capable of thermally-induced elastic recovery; and (3) one or more modification zones comprising a central portion and a rim portion surrounding the central portion, the modification zone being surrounded by land portion, wherein the average thickness of each rim portion is greater than the average thickness of the land portion surrounding the modification zone, the average thickness of each central portion is less than the average thickness of the land portion surrounding the modification zone and is greater than zero.

BRIEF DESCRIPTION OF DRAWING

The invention is further explained with reference to the attached drawing wherein.

These figures are not to scale and are intended to be merely illustrative and not limiting. Like reference numbers are used to indicate like members and features.

DETAILED DESCRIPTION OF ILLUSTRATIVE EMBODIMENTS

Key and Glossary

Figure 1:
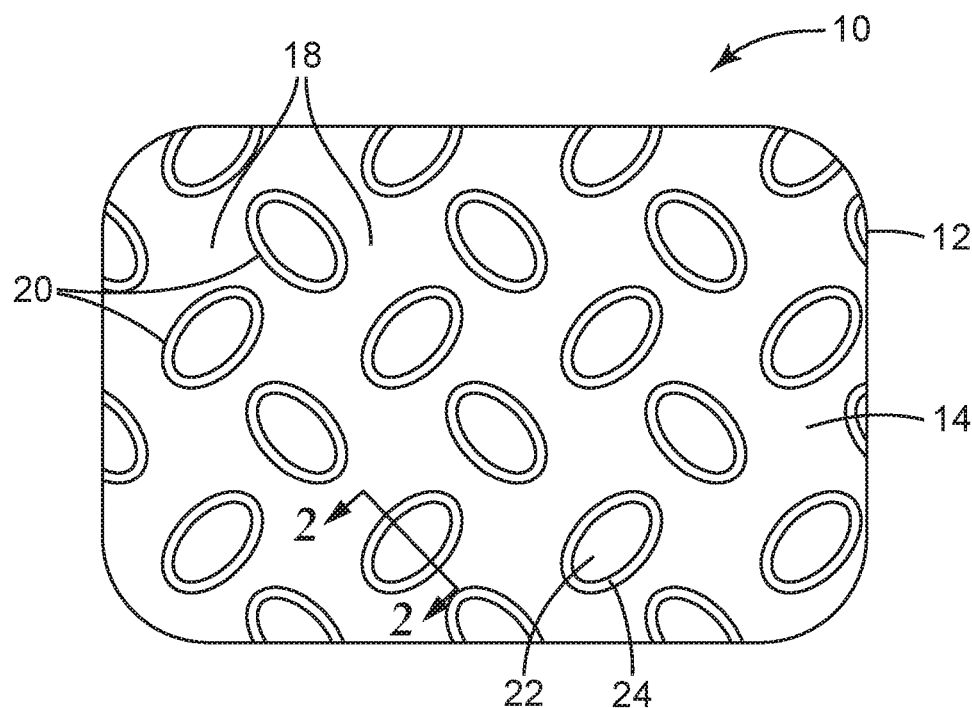
FIG. 1 is a plan view of the first major face of an illustrative embodiment of a sheet of the invention.

For the following defined terms, these definitions shall be applied, unless a different definition is given in the claims or elsewhere in this specification.

The terms "differential heating" and "localized heating" mean heating the principal film such that the temperature of select portions of the principal film (i.e., in an x-y perspective across the film) is raised to a level higher than the temperature of adjacent portions of the principal film. Such heating may be carried out by such means as flame impingement (e.g., as described in U.S. Pat. No. 7,037,100), selective directed infrared radiation, etc.

The term "orientable" means that the polymer material, if heated above a certain temperature ($T_o$ or orientation temperature) and drawn, will undergo shifting and orientation of polymer segments therein, and then if cooled below $T_o$, will retain some of the imparted orientation when subsequently released. The temperature at which a specific polymer film may be oriented will depend in part upon the distribution of segments of polymer materials within the film and respective melting points of components fractions in the film.

The term "polymer" is used to refer to polymers, oligomers, copolymers (e.g., polymers formed using two or more different monomers), and combinations thereof, as well as polymers, oligomers, or copolymers that can be formed in a miscible blend by, for example, coextrusion or reaction, including transesterification. Both block and random copolymers are included, unless indicated otherwise.

The term "thermally-induced elastic recovery" refers to the action or response whereby a member or body of material, upon being heated to a threshold temperature (referred to herein as $T_r$, or relaxation temperature), spontaneously changes its shape or configuration, without application of external mechanical form-changing forces (e.g., gravity, embossing, molding, etc.) or without undergoing material removal effects (e.g., mechanical etching, ablation such as by laser, combustion, evaporation, etc.).

The term "flame impingement" refers to a process for heating a principal film wherein a heat flux in the form of a flame is directed to a first major surface of a film. An illustrative example is disclosed in U.S. Pat. No. 7,037,100 (Strobel et al.).

Flame properties are commonly correlated with the molar ratio of oxidizer to fuel. The exact ratio of oxidizer to fuel needed for complete combustion is known as the stoichiometric ratio. The equivalence ratio is defined as the stoichiometric oxidizer:fuel ratio divided by the actual oxidizer:fuel ratio. For "fuel-lean", or oxidizing, flames there is more than the stoichiometric amount of oxidizer and so the flame equivalence ratio is less than one. For "fuel-rich" flames, there is less than the stoichiometric oxidizer present in the combustible mixture and thus the equivalence ratio is greater than one.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g., 1 to 5 includes 1, 1.5, 2, 2.75, 3, 3.80, 4, and 5). As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

For purposes of clarity and without intending to be unduly limited thereby, the tape sheets or strips in a group of any two sequentially stacked sheets or strips are referenced as an overlying tape sheet and an underlying tape sheet with the adhesive layer of the overlying tape sheet adhered to the front or first face of the backing of the underlying tape sheet.

Principal Film of the Invention

FIG. 1 shows a portion of an illustrative principal film of the invention wherein film 10 is made from a suitable precursor film 12 (i.e., an oriented film capable of thermally-induced elastic recovery) having: (1) first major face 14 and opposite second major face 16; (2) a land portion 18; and (3) one or more modification zones 20 each comprising a central portion 22 and a rim portion 24 surrounding the central portion, the modification zone 20 being surrounded by land portion 18.

Figure 2:
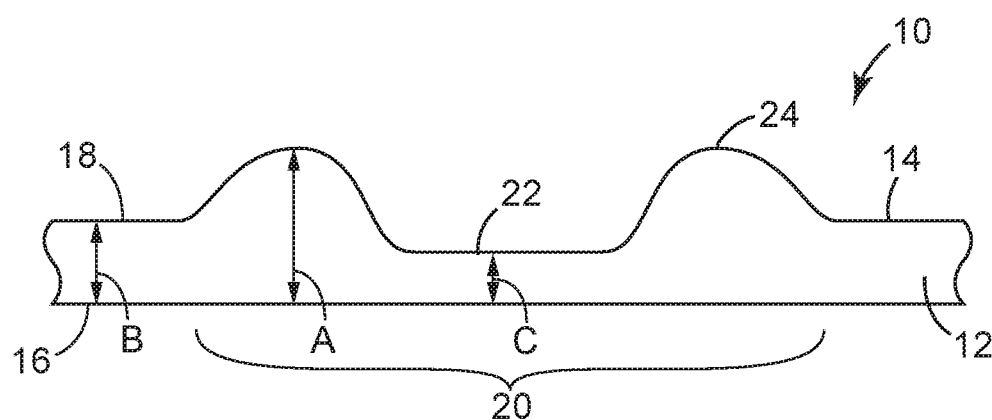
FIG. 2 is a cross-sectional view of a portion of the sheet shown in FIG. 1.

FIG. 2 shows a cross section of a modification zone of a principal film of the invention. In accordance with the invention, land portion 18 surrounds the modification zone 20 which is made up of rim portion 24 surrounding central portion 22. The average thickness of rim portion 24 (dimension B) is greater than the average thickness of land portion 18 (dimension A) which in turn is greater than the average thickness of central portion 22 (dimension C). Though the profile of thickness of central portion 22 may be curved (i.e., one or both of major faces 14 and 16 may be contoured throughout central portion 22 rather than being flat as shown), dimension C is greater than zero throughout the central portion 22. The modification zone of films of the invention is impermeable rather than having through channels such as are found in previously known films formed via flame impingement.

Figure 6:
FIG. 6 is a photograph of a cross section of a modification zone of a film of the invention.

It will be understood that FIGS. 1 and 2 are idealized; for instance, the second major face of the film may not be flat. Depending in part upon the nature of the precursor film and manner of carrying out differential heating, the modification zone may comprise some thickening and protrusion of the film on its second major face. For example, as shown in FIG. 6, the central portion of the modification zone extends or protrudes in the direction of the second major face relative to the surrounding land portions of the film, resulting in part from the tendency of that portion of the film to sag into the opening on the roll used to carry out flame impingement and differential heating.

Precursor Films

Precursor films useful to make conformable, hand tearable principal films and articles of the invention are typically oriented films having a semicrystalline component.

In some common embodiments, they comprise oriented polyolefin polymers (e.g., polypropylene, polyethylene, etc., or combinations thereof). In addition, films capable of thermally-induced elastic recovery can be made from other materials (e.g., polyester, polystyrene, polyamide, etc.)

Perhaps the most widely used oriented polymer backing film is biaxially oriented polypropylene, or BOPP. BOPP film based adhesive tapes are widely used as for example carton, label and box sealing tapes (such as 3M® SCOTCH® Box Sealing Tape 373, 3M Co., St. Paul Minn.). Such tapes are popular because of their good strength, water resistance, and low cost. Other typical tapes employ oriented polyester such as 3M® Polyester Tape 850, 3M Co. Both BOPP and biaxially oriented polyester (BOPET) are semicrystalline polymers.

The processes used to produce oriented polymer films are well known and can be typically accomplished using blown film or tenter-stretched film processes. For reasons of economy and uniformity the tenter stretching process is most widely employed to produce films for adhesive tape backings, typically in the range from about 10 microns up to about 75 microns or more in thickness. Tenter stretching can be accomplished using either sequential or simultaneous stretching processes; the sequential stretching process is by far the most popular. In a typical sequential process, a film is produced by stretching first in the length direction, referred to as the LO; then in the transverse direction referred to as the TDO. In a simultaneous stretching process, the film is stretched concurrently in both the LO and TDO.

Sequential tenter stretching entails melting and casting the polymer resin onto a chilled casting roll, then transporting the sheet to a first length orientation section. It is desirable to cast the film at a low temperature with maximum quenching, which retards the growth of large crystalline morphology and thereby produces the highest clarity and strength film.

Length orientation (LO) is usually accomplished by passing the cast sheet over a series of heated contact rolls that are driven at differential speed, thereby both heating and stretching the film in the length direction. Typical LO ratios are about 4 or 5:1 times. Following the LO step, the partially stretched film is then fixture along the edges using a series of tenter clips attached to the tenter stretching frame and then transported into the tenter oven. The tenter oven is usually heated to temperatures up to about the crystalline melting point temperature, allowing the film to soften sufficiently to allow transverse direction (TD) stretching to a ratio of about 8:1 to about 10:1.

Stretching a cast sheet at too low of a temperature requires very high forces and often results in the film tearing or breaking, especially in the tenter oven. Stretching a film at too high a temperature above the crystalline melting point results in the film exhibiting poor retained orientation as well as caliper defects caused by droop or sag in the tenter stretching process. REFERENCES: R. A. Phillips & T. Nguyen, *J. Appl. Polym. Sci.*, v. 80, 2400-2415 (2001); and P. Dias et al., *J. Appl. Polym. Sci.*, v. 107, 1730-1736 (2008). It is desirable to stretch the cast sheet at a temperature that allows for low force stretching but that also is below the melting point of the polymer so that the film exhibits a high degree of molecular orientation, which is preferred for strength and dimensional stability in use.

Precursor films suitable for use as principal films of the invention should be capable of thermally-induced self-forming. Preferably, precursor films exhibit a shrinkage response of not more than about 1%, preferably not more than about 0.3%, as evaluated according to ASTM D2732.

Additives

Backing members of tapes of the present invention may optionally include one or more additives and other components as is known in the art. For example, the backing member or component members thereof may contain fillers, pigments and other colorants, antiblocking agents, lubricants, plasticizers, processing aids, antistatic agents, nucleating agents (e.g., beta nucleating agents), antioxidants and heat stabilizing agents, ultraviolet-light stabilizing agents, and other property modifiers (e.g., agents to improve compatibility, increase or decrease bonding properties, etc. with desired adhesives and other materials). Fillers and other additives are preferably added in an amount selected so as not to adversely affect the properties attained by the preferred embodiments described herein.

Illustrative examples of organic fillers include organic dyes and resins, as well as organic fibers such as nylon and polyimide fibers, and inclusions of other, optionally cross-linked, polymers such as polyethylene, polyesters, polycarbonates, polystyrenes, polyamides, halogenated polymers, polymethyl methacrylate, cyclo-olefin polymers, and the like. Illustrative examples of inorganic fillers include pigments, fumed silica and other forms of silicon dioxide, silicates such as aluminum silicate or magnesium silicate, kaolin, talc, sodium aluminum silicate, potassium aluminum silicate, calcium carbonate, magnesium carbonate, diatomaceous earth, gypsum, aluminum sulfate, barium sulfate, calcium phosphate, aluminum oxide, titanium dioxide, magnesium oxide, iron oxides, carbon fibers, carbon black, graphite, glass beads, glass bubbles, mineral fibers, clay particles, metal particles, and the like.

In some applications it may be advantageous for voids to form around the filler particles during an orientation process, or use entrained blowing agents to form voids. Organic and inorganic fillers may also be used effectively as antiblocking agents. Alternatively, or in addition, lubricants such as polydimethyl siloxane oils, metal soaps, waxes, higher aliphatic esters, and higher aliphatic acid amides (such as erucamide, oleamide, stearamide, and behenamide) may be employed.

The backing member may contain antistatic agents, including aliphatic tertiary amines, glycerol monostearates, alkali metal alkanesulfonates, ethoxylated or propoxylated polydiorganosiloxanes, polyethylene glycol esters, polyethylene glycol ethers, fatty acid esters, ethanol amides, mono- and diglycerides, and ethoxylated fatty amines. Organic or inorganic nucleating agents may also be incorporated, such as dibenzylsorbitol or its derivatives, quinacridone and its derivatives, metal salts of benzoic acid such as sodium benzoate, sodium bis(4-tert-butyl-phenyl)phosphate, silica, talc, and bentonite.

Antioxidants and heat stabilizers can further be incorporated, including phenolic types (such as pentaerythrityl tetrakis [3-(3,5-di-tert-butyl-4-hydroxyphenyl)propionate] and 1,3,5-trimethyl-2,4,6-tris(3,5-di-tert-butyl-4-hydroxybenzyl)benzene), and alkali and alkaline earth metal stearates and carbonates. Other additives such as flame retardants, ultraviolet-light stabilizers, compatibilizers, antimicrobial agents (e.g., zinc oxide), electrical conductors, and thermal conductors (e.g., aluminum oxide, boron nitride, aluminum nitride, and nickel particles) may also be blended into the polymers used to form the tape backing member.

Modification Zones

As shown in FIG. 2, the principal layers of backing members of tapes of the invention have modification zones with central portions extending (i.e., thinning from first face to second face) from the first face thereof toward but not reaching the second face. The configuration of such novel films is novel and provides many surprising advantages.

Certain surprising aspects of the present invention are more easily achieved with an understanding of the effective equivalence ratio used in flame perforation processes and effective exploitation thereof.

In a fuel-rich flame, the overall environment in which the film is exposed is primarily reducing in nature because of the high concentration of hydrogen atoms, carbon monoxide, and hydrocarbon free radicals, yet some oxidation of the film occurs because there are some oxidizing species still present in the flame product gases. In contrast, in a fuel-lean flame such as is taught in the art for the surface treatment of polymers to impart higher adhesion properties thereto, the overall environment is highly oxidizing because of the high concentrations of oxygen molecules and hydroxyl radicals.

Flame impingement to carry out differential heating and modification of the principal film in accordance with the invention requires relatively high flame powers to modify and differentially heat the polymer film at commercially desirable film speeds. For example, flame powers of at least about 10,000 Btu/hr per inch of cross-web burner length (1160 Watts/cm) are typically desirable to enable differential heating at speeds of from about 20 to over 100 meters/min. When using the fuel-lean flames that are taught in the art as optimal for the flame processing of polymers, such conditions of high flame power and relatively low film speed cause significant oxidation of the polymer surface. When a polymer surface is relatively highly oxidized, adhesion to that surface is typically high. Thus, if a fuel-lean flame is used for flame impingement, the resulting rims are oxidized to such an extent that the pressure-sensitive adhesives tend to adhere more strongly to the rims, thereby interfering with and in some instances preventing unwind of the tape. We have found that undesired oxidation of the polymer rim surface can be limited by using low-power fuel-lean flames (for example, at powers of less than about 5000 Btu/hr-in.). However, when using such low-power flames, it is not possible to effectively modify the film at commercially viable film speeds.

It is surprising that fuel-rich flames can be used at sufficiently high powers to enable differential heating sufficient to achieve desired thermally-induced self-forming at film speeds of more than about 20 meters/min, but without causing the excessive oxidation of the rims that might prevent smooth and easy unwinding of, for instance, finished tape made with such principal films.

It has been found that backing members having modification zones as described herein (i.e., raised rims protruding from the first major face of the backing in modification zones) can enable release from the adhesive of overlying tape portions or sheets from underlying portions without use of a release coating on the first side of the backing or an intervening removable release liner. Such rims are of sufficient height to enable the finished tape to be unwound without excessive force, tearing of the backing, or cohesive failure of the adhesive.

By eliminating the need for such coatings or liners, the present invention enables significant simplification of tape manufacture and use because no coating steps, drying ovens, solvent recovery systems, or radiation curing processes, as are typically involved with use of release coatings, are necessary. Elimination of solvents eliminates volatile organic compounds, and also eliminates the energy to run ovens such that the overall tape manufacturing process is more efficient. The absence of oven drying causes less thermal damage to oriented film substrates, simplifies web handling operations, and enables use of a much smaller space for manufacturing operation.

The rims of melted polymer on the first major face of the principal film enable the smooth and easy unwind of tapes made therefrom in accordance with the invention. It is thought that the maximum height of the rims is a critical parameter enabling adhesive release and subsequent unwind because the highest points on the rim are the locations that hold the pressure sensitive adhesive farthest from the primary surface of the perforated film (i.e., the portion of the first face or side between perforations and their rims). Adhesion between the highest points of the melted rim of modification zones formed with a fuel-rich flame and the adhesive will be limited because the small area of contact between the rim and the adhesive and the low extent of oxidation of the rim.

The configuration and arrangement of the modification zones provide a principal film that can be readily torn in straight or substantially straight lines, yet has a sufficient tensile strength to be used as a backing member in adhesive tapes. Tear initiation and propagation parameters of tapes can be controlled as desired by controlling the arrangement and geometry of the modification zones.

The principal film is typically tearable by hand in at least one direction, and can be formed such that it is hand tearable in two perpendicular directions. The principal films of the invention can have relatively low tear initiation energy and relatively high tear propagation energy as compared to similar polymeric films that are not modified to possess modification zones in accordance with the invention. In addition, the modification zones of principal films of the invention allow tearing of the films in substantially straight lines compared to similar polymeric films that have not been modified in accordance with the invention. The modification zones allow such improved tear properties without excessively weakening the tensile strength of the film.

Through control of film properties (e.g., tenter ratio/magnitude, film thickness, etc.) and differential heating process conditions and equipment (e.g., film speed and thickness, arrangement, and shape of heating zones, etc.), the position, spacing, and shape of modification zones may be controlled as desired (e.g., to optimize tear initiation and propagation forces, tear directionality, conformability, etc.). For instance, the modification zones may be substantially circular, oval, diamond-shaped, triangular, or of some other geometry, and may be arranged in an ordered homogeneous array or in an irregular manner (e.g., where spacing or relative position or both are varied).

In some embodiments where easier tear of an adhesive tape comprising a film of the invention as the backing is desired, the modification zones in the polymeric film are typically preferably non-circular and have a length at least 1.25 times their width, and typically at least 2 times their width. Although different individual modification zones across the principal film may exhibit variation, with their respective central portions and surrounding rim portions varying somewhat in size, they typically each have a major axis and a minor axis. The major axis is a line along the length of the modification zone, and the minor axis is a line along the width of the modification zone (e.g., to create a herringbone pattern). In one implementation, a line projected along the major axis of each modification zone passes through an adjacent second modification zone. In specific implementations a line projected along the major axis of each modification zone passes through an adjacent modification zone along or parallel to the minor axis of the adjacent modification zone.

In accordance with the invention, the modification zones are arranged in a fashion such that they promote easy tearing of the film in the down-web or machine direction (MD) and in the cross-web or transverse direction (TD). The modification zones sufficiently preserve the tensile strength of the film that it may be sufficiently robust to serve as a tape backing while imparting desirable straight line tearing characteristic to the film such that it can be used conveniently as a tape backing. The invention enables formation of hand tearable sheets and tapes using polymeric films as backings that would otherwise exhibit undesirable tear and tensile properties such as slivering when peeled from a roll or surface to which they have been applied (e.g., such as with masking tape), unduly high tear initiation force, unduly high tear propagation force, tendency to result in jagged or non-straight tear lines, etc. Adhesive tapes made using films of the invention can provide superior tear properties such as controlled tear propagation to avoid slivering, splitting, and unpredictable failure; uniform texture for eased of handling and application, and the ability to visually indicate proper adherence by serving as a visual indicator of adhesive wet-out. The latter performance parameter is particularly valuable for embodiments where films of the invention are used as backings for masking tapes.

In many embodiments, the central portions and complementary surrounding rim portions are typically circles, elongate ovals, rectangles, or other shapes arranged in a fashion such that the major axis of each modification zone intersects adjacent modification zones or passes near adjacent modification zones to provide optimum tear properties.

A feature of tapes of the invention is the modification zones in the backing each have a raised ridge or rim formed during flame impingement. This raised ridge consists of polymer material from the interior of the modification zone that has elastically recovered from the orientation imposed on the precursor film. Previously, this rim has been observed to provide enhanced tear properties of the perforated film and to also impart slight textures that cause the film to more closely resemble a conformable material. As discussed above, such raised ridges or rims have been surprisingly found to eliminate the need for use of a release coating or liner in an adhesive tape construction.

Figure 4:
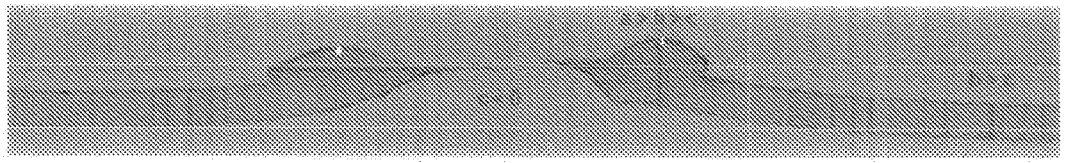
FIG. 4 is a photograph of a cross section of a portion of a flame perforated film of the prior art.

As discussed in U.S. Pat. No. 7,037,100 with reference to FIG. 4 therein,

"The perforation pattern formed in polymeric film 14 has a strong influence on the tear and tensile properties of the cloth-like films and tape backings of the invention. In reference now to FIG. 4, a portion of an enlarged layout of a typical perforation pattern 28 is shown, with the machine direction oriented up and down, and the transverse direction oriented left to right. Depicted perforation pattern 28 comprises a series of rows of perforations, identified as a first row having perforations 1a, 1b, and 1c; a second row having perforations 2a, 2b, and 2c; a third row having perforations 3a, 3b, and 3c; a fourth row having perforations 4a, 4b, and 4c; and a fifth row having perorations 5a, 5b, and 5c. Typically the perforations form a pattern extending along most or all of the surface of a film, and thus the pattern shown in FIG. 4 is just a portion of one such pattern."

U.S. Pat. No. 6,635,334 (Jackson et al.) and U.S. Pat. No. 7,138,169 (Shiota et al.) disclose a number of patterns that might be used in for modification zones in a principal film of the present invention to attain desired resultant tear, crease, folding, and other physical properties of the resultant tape. In accordance with the present invention, such patterns may be used to form closed modification zones (i.e., central portions of the modification zones do not penetrate completely through the film in the manner of the perforations disclosed in the prior art).

Without wishing to be bound by any theory, it is believed that the density of the modification zone pattern contributes to both the conformability and fold-ability of the films and tapes of this invention and the tear and tensile properties, and that lowering the density or changing its distribution in such a way as to provide channels, along either the machine direction (MD) or the cross-web or transverse direction (TD) or both, in which a propagating tear might encounter no modification zones, results in decreased conformability, and less desirable tear and tensile properties along the direction of such a modification free channel, compared to the most preferred pattern. Tapes of this invention conform to substrates such as boxes, containers, skin, automotive parts and panels, and other materials thereby enabling the intimate contact of the pressure sensitive adhesive with the part or substrate and thus increasing the adhesion between the tape and the substrate. In addition, adhesive tapes of present invention can be folded so as to produce a soft paint edge when used in a typical paint spraying operation, as is well known for comparable paper-backed masking tapes.

Also, it is believed that the raised rim portion around each central portion serves to blunt propagation of the tear, resulting in better control of the tear by hand, and increase in tear propagation force (relative to that of unperforated film). The tear initiation force, however, is reduced, relative to that of precursor film, especially for the most preferred pattern, because the modification zone density guarantees that the edge of any film or tape so constructed will have modification zones either at or extremely near the edge. Surprisingly, it has been found that tapes made as described herein can exhibit very sharp and uniform paint lines when used in masking applications, even with the as-described modification zones and differential thickness. It is believed that such films and the resultant tapes have superior conformability in the thickness or z-axis dimension, thereby allowing improved contact to the substrate to which they are adhered. Therefore, for the purposes of tear initiation, the inventive films and tapes behave similarly to notched films but without the occurrence of significant slivering, which is a problem for paper-backed masking tapes especially when utilized in a wet environment.

Formation of Modification Zones

Principal films of the present invention can be manufactured using various film forming, orientation, and differential heating techniques that provide modification zones with rims and recessed but not open central portions as described herein.

Formation of modification zones in films in accordance with the invention to yield a principal film is carried out by (A) providing a precursor film that: (a) is capable of thermally-induced elastic recovery; and (b) has first and second major faces;

(B) differentially heating at least one target zone of the precursor film above its relaxation temperature ($T_r$) while maintaining the temperature of the portion of the precursor film surrounding the target zone at a temperature below its $T_r$ so as to cause dimensional modification of the precursor film within the target zone such that a portion of film material in the target zone undergoes thermally-induced elastic recovery and forms a modification zone comprising a central portion surrounded by a rim portion wherein maximum thickness of the rim portion becomes relatively greater and the relative thickness of the central portion decreases but without opening completely between the first and second major faces of the precursor member; and then (C) cooling the modification zone to below $T_r$, thereby yielding a principal film having: (1) first and second major faces; (2) a land portion wherein the principal film is capable of thermally-induced elastic recovery; and (3) one or more modification zones, each modification zone comprising a rim portion protruding from the first major face of the principal film and surrounding a central portion. An adhesive tape of the invention is then made by applying normally tacky, pressure sensitive adhesive disposed to the second major face of the principal film (i.e., when the backing member consists essentially of the principal film) or to the second major surface of the backing member (i.e., when the backing member comprises the principal layer and an optional secondary layer bonded to the second major face of the principal film (e.g., by extrusion)).

It is not necessary for each of the modification zones to be wholly identical to the others or absolutely precise in shape, size, or openness. Many techniques and apparatus known in the art for flame perforation can be employed in the present invention. As they do when used for conventional flame perforation, when used to form modification zones in accordance with the invention, such techniques and apparatus will yield principal films having modification zones that vary somewhat in size and perfection of shape. This does not have a significant deleterious effect on the current invention.

The method and process conditions used to carry out formation of modification zones are selected in part based upon the desired modification zones and nature of the films. It is typically preferred that the process be carried out so as to minimize the degree of thermal damage the film undergoes aside from formation of the desired modification zones.

Passing the web through the flame impingement station at higher speed results in formation of relatively smaller modification zones. As will be understood by those skilled in the art, other flame impingement conditions used (such as the flame power, the burner-to-film separation, or backing roll patterns) can be adjusted to attain similar modification zone sizes and spacing or any desired array of modification zones.

The pattern of depressions (sometimes referred to as indentations, wells, or dimples) in the backing roll that are used to achieve the desired differential heating determines in part the arrangement and dimensions of the resultant modification zones with each modification zone corresponding to a dimple or depression in the backing roll. In some instances, the modification zones are arranged in an ordered array. In some instances, the modification zones are arranged in a random manner. If desired, the modification zones may have substantially similar individual configuration (i.e., from using backing rolls with depressions that are substantially in shape and dimension), or the modification zones may have varied individual configuration (i.e., from using backing rolls having depressions that vary accordingly in shape, dimension, or both).

If desired, a tape may be made wherein the principal film has first segment having a first array of a plurality of modification zones and a second segment having a second array of a plurality of modification zones wherein the first array differs from the second array in one or more characteristics. This can be achieved by using a backing roll having corresponding arrays of depressions to form the multiple segments simultaneously or forming the respective segments of modification zones sequentially. As desired, respective arrays of modification zones may be formed that include differences in one or more of the characteristics selected from the group consisting of: (1) average distance between adjacent modification zones, (2) shape of modification zones, (3) dimension of modification zones, and (4) average thickness of rim portions.

Flame impingement can be performed by, for example, the process specification given for Example 1 of U.S. Pat. No. 7,037,100. Such apparatus ordinarily employs premixed laminar flames in which the fuel and the oxidizer are thoroughly mixed prior to combustion. However, in contrast to the process described in U.S. Pat. No. 7,037,100, in some embodiments of the present invention a fuel-rich flame is used. According to the properties desired of the resultant film, the flame impingement process may be carried out so as to impart desired surface characteristics (e.g., using a relatively fuel rich mix when increased release tendencies are desired (e.g., to achieve release with reduced or eliminated release agent) as opposed to using a relatively fuel lean mix when increased bonding tendencies are desired). The side of the film that is exposed to the flame during formation of the modification zones develops the rims of elastically recovered polymer material that surround the central portion. Though shown in schematically ideal manner in FIG. 2, the rim portion of the modification zone may typically be made up of protrusion of the film outwardly (i.e., z-axis) from both the first and second major surfaces of the film (e.g., as shown in FIG. 4). It has been found that these rims can effectively act as the release surface for the adhesive subsequently applied by minimizing the contact between the backing member and the adhesive when wound into the common roll form of tape. In instances where it is important that the rim surface exhibit release properties, it is critical that the process for formation of modification zones be performed by using flame conditions that do not overly oxidize the first major surface of the film in either the raised rims or surrounding land portion; that is, by using flame conditions that minimize the adhesion-promoting characteristics of the surface oxidation typically caused by exposure to a flame. While flame-induced surface oxidation cannot be totally eliminated, oxidation is maximized at a flame equivalence ratio of 0.92 to 0.96, but minimized at flame equivalence ratios of at least about 1.05, which are fuel-rich flames [See C. Stroud et al., *Progress in Energy and Combustion Science*, 34 (6), 696-713 (2008)]. It is therefore necessary to conduct the flame impingement process using a fuel-rich flame, preferably with an equivalence ratio of about 1 and preferably at least about 1.05. Use of fuel-rich flames for flame perforating polymers is contrary to essentially all recommendations in the art of flame treating. The advantages obtained from suing such backing members, e.g., improvement in unwind in the tape roll form is good, resistance to paint penetration, etc. are surprising outcomes from this processing choice.

A surprising and advantageous aspect of the invention is that the modification zones are impermeable, that is they do not penetrate completely through the film.

It is known (e.g., from U.S. Pat. No. 7,037,100 and the like) that oriented polymeric films can be exposed to a high heat flux source such as a flame while wrapped on a cooled tooled backing roll, causing differential heating of the two major surfaces. It is thought that the exposure of the film sections directly spanning a tooled indentation in the cooled backing roll causes a very rapid heating of that film section which causes a sudden, uncontrolled release or relaxation of the film orientation and results in a perforation being formed with associated 'rim' material at the margins of the perforation opening, comprising the mass of relaxed polymer molecules caused by this shrinkage. This process is termed thermally induced elastic recovery. The present invention relates to the surprising discovery that, by using precursor films such as a described herein, modification zones with closed central portions can be formed rather than modification zones with perforations as was previously known.

In the prior art, the resultant modifications lead to perforations that extend completely through the entire thickness of the film as shown in FIG. 4 where:

"a" =thickness of the rim

"b" =thickness of the land portion

"c" =thickness of the central portion which is a perforation (i.e., it reaches zero).

Figure 5:
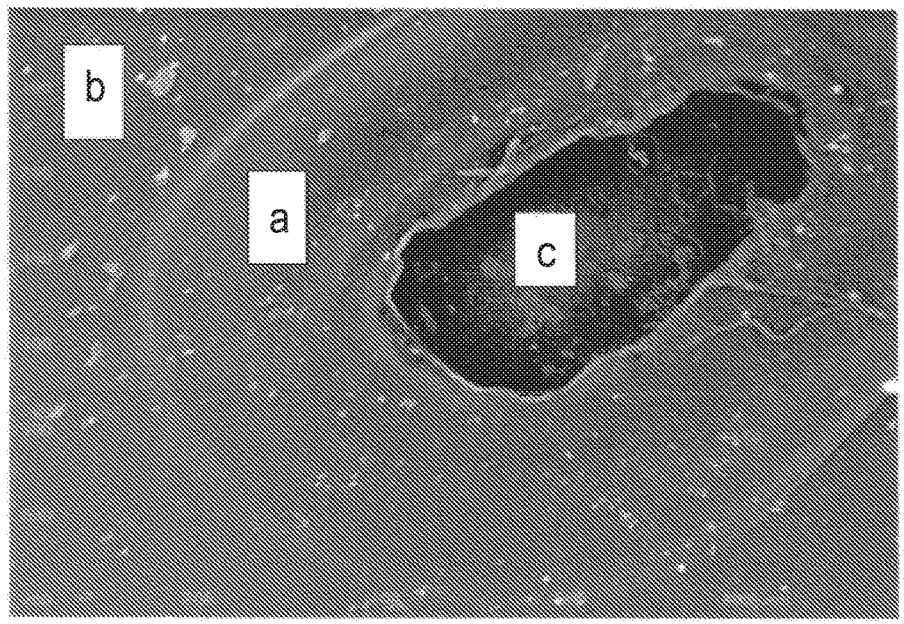
FIG. 5 is a scanning electron microscope photograph of a portion of a flame perforated film of the prior art.

FIG. 5 is a scanning electron microscope photograph showing the open perforation caused by thermally-induced elastic recovery of the film, 80× magnification. The rim portion, land portion, and central portion of the thermal modification zone are labeled as a, b, and c.

In these prior art cases, the differential heating process causes thermal modification to result in the rim section "a" being at least as thick as the land zones "b", and the perforation zone "c" has zero thickness. The utility of such films is limited by the presence of the perforations, which does not allow their use directly as paint masking tape backings or masking sheets, and also prevents their use in coating processes involving liquid coating materials such as solvent or water-based coatings.

Figure 7:
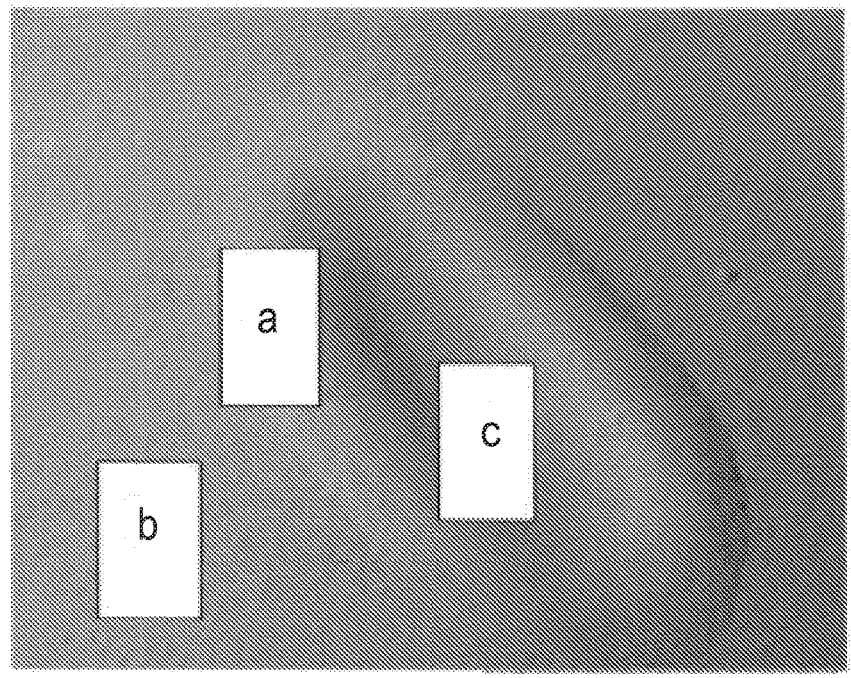
FIG. 7 is a scanning electron microscope photograph of a modification zone of a film of the invention.

We have discovered a family of polymer films which, when subjected to the differential heating process described above, form thermally induced modification zones that provide hand tearability but in which there are no perforations through the thickness of the film. Such films are very desirable for use as adhesive tape backings. In this case, the process of thermally induced elastic recovery results in a new type of film geometry as shown in FIGS. 6 and 7. As seen in FIG. 6, in films of the invention, the modification zone comprises a central portion C, surrounded by a rim portion A surrounded by land portion B. Unlike the prior art films, central portion C has a thickness greater than zero. FIG. 7 is a scanning electron microscope photograph of a modification zone at 80× magnification.

In this invention, application of differential heating induces the novel result that the thermal modification zone "c" is greater than zero, yet still provides for ready hand tearing of the film. In this embodiment, the thickness of the rim portion of the modification zone "a" approaches that of the surrounding land portion "b" and is thicker in other areas. The thickness of the central portion "c" is always less than both "a" and "b" and, in a departure from the art, greater than zero.

Such films can be used as paint masking adhesive tape backings or sheeting, and can be used in liquid coating processes. Films of the invention in addition exhibit good tear properties, good strength, good conformability and stretch, excellent water resistance as well as low unwind when used as a roll of adhesive coated tape. In addition, the structure imparted by the thermal modification process results in an adhesive tape or sheet which is easier to handle due to the relative increase in thickness or loft of the film as well as the texture thus imparted.

Not to be bound by theory, it is thought that the inventive films have a lower degree of overall molecular orientation, which results in the gross film having a reduced amount of elastic recovery or shrinkage in the direction of maximum stretching. For typically sequentially oriented polymer films, this direction is the TD direction. For simultaneously oriented films this direction would be that of highest stretching extent or in balanced films, along both major axes. It is thought that the thermally induced elastic recovery of the orientation produced by the stretching process is the driving force behind formation of the open perforations and surrounded by thickened rims as in the prior art example; in the present case the inventive films have less than some critical level of elastic recovery potential available so as to form thinned but not open central portions.

Figure 3A:
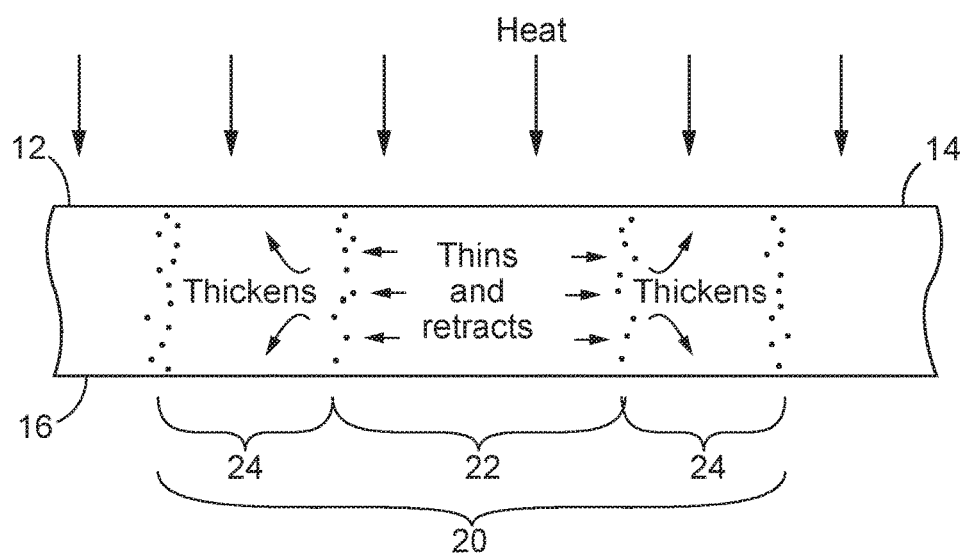
FIG. 3A is a schematic cross-sectional view of a portion of an illustrative modification zone showing the impact of thermally-induced elastic recovery during differential heating in accordance with the method of the present invention.
Figure 3B:
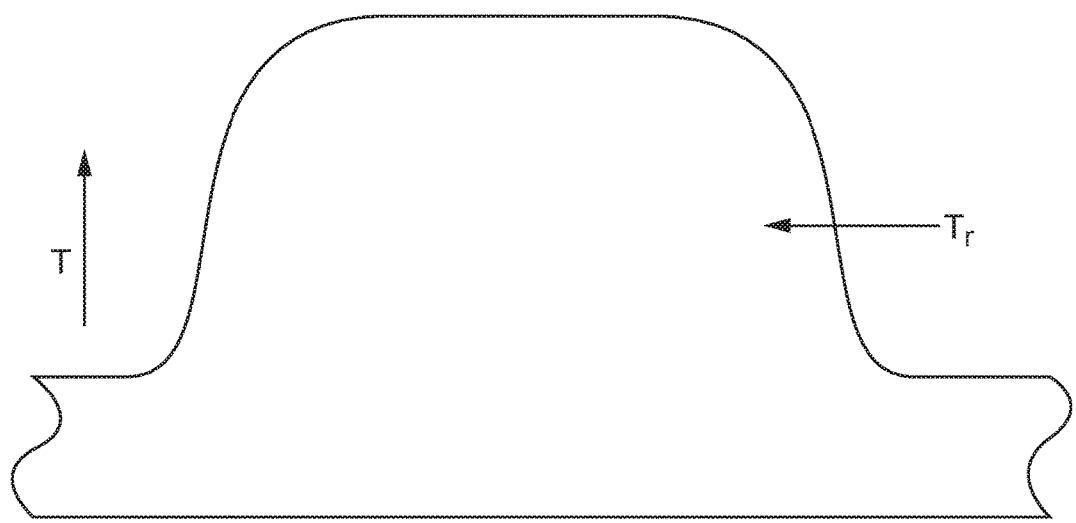
FIG. 3B is a graphical illustration of the temperature profile within a corresponding precursor film of the invention during differential heating in accordance with the method of the invention.

The impact of desired thermally-induced elastic recovery as a result of differential heating may be better understood with reference to FIGS. 3A and 3B.

FIG. 3A is a cross-sectional schematic of a precursor film 12 of the invention. Upon application of heat to first face 14, film 12 would tend to rise in temperature. The second surface 16 of film 12 is in contact with a chill roll (not shown), having an array of recesses or dimples in the surface thereof. The portions of film 12 in contact with the chill roll typically warm somewhat, but the temperature increase is limited as the underlying chill roll acts as a heat sink. In contrast, the portions of the film 12 lying over the recess in the surface of the chill roll cannot as effectively conduct thermal energy thereto and thus undergo a relatively large temperature increase as illustrated by the curve in FIG. 3B. As a result of this temperature increase, the portion of the film 12 in the zone of large temperature increase undergoes modification as a result of thermally-induced elastic recovery. Within the modification zone, the flux of heat leads to a large temperature increase in modification zone 20 which is made up of the central portion 22 and surrounding rim portion 24. Within the central portion 22, the high temperature causes release of the orientation of the polymeric segments resulting the polymer body thinning and retracting. Within the surrounding rim portion 24, the temperature within the polymer ranges from the high zone nearest the central portion down to the lower temperature in the chilled land portion; within the rim portion, the polymer retracts material from the central portion, leading to an increase in relatively thickness as compared to the surrounding land portion.

The ability to form films with such impermeable modification zones is believed to be due to the nature of the oriented film used as precursor film.

In some embodiments, the precursor film is a sequential tenter-stretched film exhibit an elastic recovery lower than about $-2.0$ N/m$^2$ as measured in the transverse film direction (TD) using a DMA. In some embodiments, precursor films used in accordance with the invention exhibit an initial tensile modulus in the transverse direction of less than about 2500 MPa as measured by Instron.

In some embodiments, desired limited thermally-induced elastic recovery to yield modifications having impermeable central portions are expected from oriented films exhibiting one or more of the following:

| Characteristic | Characteristic |
|---|---|
| DMA elastic shrink stress in TD | Less than $-2.000$ MPa |
| Tensile modulus in TD | Less than 2500 MPa |
| AST thermally induced elastic recovery in TD | Less than $-1.0\%$ |

Notes on data in table: Tensile modulus in TD has been calculated by using cross-sectional area of the input film specimen. AST is automated shrinkage test.

For many embodiments where easy hand tearing is desired, it is sometimes preferred that the resultant principal film exhibit an un-notched tear strengths of about 100 gram-force ($g_f$)/mil-thickness or less, more preferably about 70 $g_f$/mil-thickness or less, and most preferably about 55 $g_f$/mil-thickness (e.g., in the transverse direction of a tape). If the film's tear force is too high then the film may be unduly difficult to tear by hand, though in some applications of films of the invention this may be acceptable.

Illustrative examples of films useful as precursor films in this invention include any polymer film capable of thermally induced elastic recovery, including polyolefins, polyesters, glassy polymers such as polyvinyl chloride and polystyrene, acrylic polymers, etc. Preferably the polymer films are oriented in at least one major direction (that is, LO or TDO meaning Length Orientation or Transverse Direction Orientation). Such oriented films are believed to provide a balance of toughness and ease of hand tearing once subjected to the differential thermal heating process.

Preferred films include sequentially or simultaneously biaxially oriented polyolefins comprising one or more component polyolefin resins and combinations of resins. Such film may in addition comprise more than one layer, preferably 2, 3, 5, 7 or more layers. Sequential or simultaneous biaxial orientation is preferably carried out using a tenter stretching process but may in addition be carried out by roller stretching, blown film stretching, or combinations thereof.

In an embodiment a polymer film may comprise blends or layers including one polymer resin having a melting point below the stretching or drawing temperature. Such lower melting components may be incorporated at any useful level, but typically comprise between about 5 to 95 weight % of the total.

In an embodiment a polymer film may comprise blends of semicrystalline and amorphous components in any combination. Component materials may include random or block copolymers, or may include physical dispersions of semicrystalline or amorphous phases of one or more materials.

In an embodiment a polymer film may comprise a multilayer film in which at least one major surface layer is a higher melting polymer relative to base or core layers. In such films exposure to the differential thermal heating process may result in desirable structures on one or both major surfaces which may be useful for example in providing texture, adhesive release, liquid impermeability or the like.

In an embodiment a polymer film may comprise a multilayer film in which at least one major surface layer is a lower melting polymer relative to base or core layers. Such films may be advantageous in providing softer surface layers yet still provide good hand tearability and liquid impermeability.

Additives, fillers, pigments, dyes, UV stabilizers, and nucleating agents may in addition be useful in the practice of this invention. Relative proportions and methods of inclusion are well known to those skilled in the art. One such embodiment is a MF 502 matte polyolefin masterbatch from A. Schulman Co., Akron Ohio.

In an embodiment, a beta nucleating agent provided in a homopolymer polypropylene masterbatch as MPM 1114 (from Mayzo Co., Suwanee, Ga.), was incorporated into PP 4792 polypropylene resin (ExxonMobil Co., Houston, Tex.). Levels of incorporation were up to about 2 weight % based on the PP 4792 resin. Films made with such combinations provided very good hand tearability and opacity which is desirable for adhesive masking tape backings.

In an embodiment, a film containing PP 5571 impact polypropylene (from Total Petrochemicals USA, Houston, Tex.) was biaxially oriented in a sequential tenter stretching process to produce a film which exhibited good hand tearability, was impermeable to liquids and opacity.

In an embodiment a film comprising multilayers including a surface layer comprising PP 9122 random propylene copolymer from ExxonMobil and a second base layer greater in thickness than the surface layer, comprising PP 5571 impact polypropylene was biaxially oriented in a sequential tenter stretching process to produce a film which exhibited very good hand tearability, good conformability, defined as the ability to form a tight radius when applied as an adhesive tape, good opacity and liquid impermeability.

Films of the invention typically comprise polymer films, in particular oriented polyolefins and their blends. The term 'polyolefin' may constitute but is not limited to, polymers of ethylene, propylene, butylene etc. as well as their random and/or block copolymers and blends. Optionally such films may constitute more than one layer, as for example, 2, 3, 5, 7 or higher numbers of layers. In this fashion different extents of thermally-induced elastic recovery may occur in different layers to produce films having novel and useful properties. Other films may be produced from polymers such as polyesters, polystyrenes or other polymers capable of forming oriented films. Non-oriented films may also be contemplated, providing their thickness permits hand tearability after exposure to the differential heating process described herein. In most cases non-oriented cast sheets exhibit a high tear force and produce irregular or non-straight tearing.

Films useful in the present invention may contain one or more components or layers in which the component or layer material is oriented at a temperature about equal to or greater than the component or layer melting point. It is thought that under such stretching conditions, the component material is considered to experience 'warm' or 'hot' drawing, which imparts a low degree of orientation in the film thereby limiting sufficient elastic recovery to form through-thickness perforations in the differential heating process.

It is believed that in such cases, the polymer molecule orientation induced by the stretching process is either relaxed during the process as for example can occur with amorphous components, or that the oriented polymer molecules, being semicrystalline but having a lower melting temperature than the stretching process temperature, can re-crystallize in less oriented state upon cooling. cf. *J. Appl Polm Sci* references above. Such films while not exhibiting perforations completely through the film thickness, still exhibit surprisingly good hand tearability.

It is believed that elastic recovery in oriented polymers controls film shrinkage and is related to the non-crystalline or amorphous 'tie chains' present in oriented semicrystalline polymers (see I. M. Ward et al., J. Appl. Polym. Sci., v. 41, 1659 (1990); "*Structure and Properties of Oriented Polymers*," ed. by I. M. Ward, Chapman and Hall, London (1997). On a molecular level, the elastic recovery arises from recoiling of the polymer chains that were extended in the stretching process, resulting from melting of the crystalline component that served to hold the strained chains in place.

Elastic recovery is also believed related to the film making process conditions, especially the temperature of film casting (that is, the quenching or casting temperature) and the temperature of stretching. The casting temperature dictates the starting morphology of the semicrystalline polymer structure and is believed to influence the volume of tie chain material present during subsequent stretching. At low casting temperatures, crystallization is very rapid and produces many smaller crystallites and a larger volume of tie chains. At higher casting temperatures near to the melting point of the polymer, crystallization is less rapid and produces fewer larger crystallites with a smaller volume of tie chains. See Capt, L., et al. "Morphology Development during Biaxial Stretching of Polypropylene Films." $17^{th}$ *Polymer Processing Society Annual Meeting*, 2001.

So-called taut tie chains present in stretched semicrystalline polymers are believed to be responsible for elastic recovery of the stretched polymer films when exposed to heat (see B. Alcock et al. "The effect of processing conditions on the mechanical properties and thermal stability of highly oriented PP tapes," Europ. Polym. J., 45(2009): 2878-2894.)

Similarly it is believed that other blend materials and/or geometrical arrangements can result in producing a stretched film that is hand tearable yet incapable of sufficient elastic recovery to lead to formation of an open perforation hole. Examples of suitable materials include block or random polypropylene copolymers with reduced crystalline content; blends of polypropylene with one or more materials having reduced or lower melting crystallite components such that the blend when stretched exhibits insufficient elastic recovery; or two or more layers of film which exhibit insufficient elastic recovery in the stretched state so that one or more layers does not form open perforation holes, or any combination thereof. Examples of suitable materials include ENGAGE™ 8401 and 8402, AFFINITY™ 820, and INFUSE™ 9507, (all from Dow Chemical Co., Midland, Mich.); and VISTAMAXX™ 6202 (from ExxonMobil Chemical Co.).

In another example, a biaxially oriented film made using a polypropylene impact copolymer containing about 15% of an impact modifier comprising ethylene-propylene rubber (EPR) dispersed in an isotactic polypropylene (available as grade 5571 from Total Petrochemicals USA, Houston, Tex.)) is found to produce no open perforation holes when exposed to the differential heating process of this invention, yet still exhibits thickened rims and most surprisingly, is still readily hand tearable.

The configuration of sheets of the invention (e.g., array of modification zones with relatively thickened rim portions, etc.) can provide many useful advantages.

Adhesive

The adhesive coated as the second major face of the backing member may be any suitable adhesive as is known in the art. Preferred adhesives are normally tacky, pressure sensitive adhesives. Selection of adhesive will be dependent in large part upon the intended use of the resultant tape. Illustrative examples of suitable adhesives include those based on acrylates, rubber resin such as natural rubber, butyl rubber, styrene copolymers, etc., silicones, and combinations thereof. The adhesive may be applied by solution, water-based or hot-melt coating methods. The adhesive can include hot melt-coated formulations, transfer-coated formulations, solvent-coated formulations, and latex formulations, as well as laminating, thermally-activated, and water-activated adhesives and are not limited except so as to provide a desirable balance of tape roll unwind and adhesion properties.

Those skilled in the art will be able to select suitable adhesives for use in the invention, dependent in large part upon the desired application.

Illustrative examples of tackified rubber hot melt adhesives that are suitable for use in tapes of the invention are disclosed in U.S. Pat. Nos. 4,125,665, 4,152,231, and 4,756,337. Illustrative examples of acrylic hot melt adhesives that are suitable for use in tapes of the invention are disclosed in U.S. Pat. Nos. 4,656,213 and 5,804,610.

Those skilled in the art will be able to readily select rotary rod or other suitable coating techniques for applying adhesive for use in articles of the invention. Selection of the coating method will be dependent in part upon the flow characteristics of the adhesive, desired penetration of adhesive into perforations, etc. Those skilled in the art will be able to readily select suitable methods for applying or coating adhesive on the sheet. Illustrative examples include rotary rod die coating, knife coating, drop die coating, etc. Illustrative examples of rotary rod coating methods that may be used to make tapes of the invention are disclosed in U.S. Pat. Nos. 4,167,914, 4,465,015, and 4,757,782.

To enhance adhesion between the backing member and the adhesive, adhesion promoting treatment(s) may be applied to the second major face of the backing member, e.g., flame treatment under fuel-lean conditions, exposure to corona, chemical primers, etc.

Pressure sensitive adhesives are well known to possess aggressive and permanent tack, adherence with no more than finger pressure, and sufficient ability to hold onto an adherend.

Additionally, the adhesives can contain additives such as tackifiers, plasticizers, fillers, antioxidants, stabilizers, pigments, diffusing materials, curatives, fibers, filaments, and solvents.

In some embodiments, the adhesive optionally can be cured by any suitable method to modify the properties thereof including rendering it less likely to flow. In particular the crosslinking level can be chosen so as to provide a balance of good tape roll unwind and finished adhesive properties. Typical crosslinking can be provided by well-known methods such as radiation-induced crosslinking (for example, UV or e-beam); thermally induced crosslinking, chemically reactive crosslinking or combinations thereof.

The adhesive may be applied in any desired amount, and typically is applied to provide a conventional dry coating weight between about 5 to about 100 g/m$^2$. Thicker adhesive coatings tend to increase probability of causing undesirable increases in unwind force. Too thin coatings are not functional or tend to wet substrate surfaces poorly.

A general description of useful pressure sensitive adhesives may be found in the Encyclopedia of Polymer Science and Engineering, Vol. 13, Wiley-Interscience Publishers (New York, 1988). Additional description of useful pressure sensitive adhesives may be found in Encyclopedia of Polymer Science and Technology, Vol. 1, Interscience Publishers (New York, 1964).

Following application of adhesive to the backing member, tape of the invention may be converted to desired configurations using known approaches, e.g., slitting, rolling, etc. Sheets of tape of the invention may be wound into roll form (e.g., one or more sheets of the tape wound upon itself about an optional core), or stacked in sheet form. In accordance with the invention, surprising advantages provided by such tape assemblies include easy unwind as the interface between the adhesive layer of overlying plies and first major face with raised rims of the principal film of underlying plies separate easily, as well as good hand tear, conformability, and other tape properties.

Figure 10:
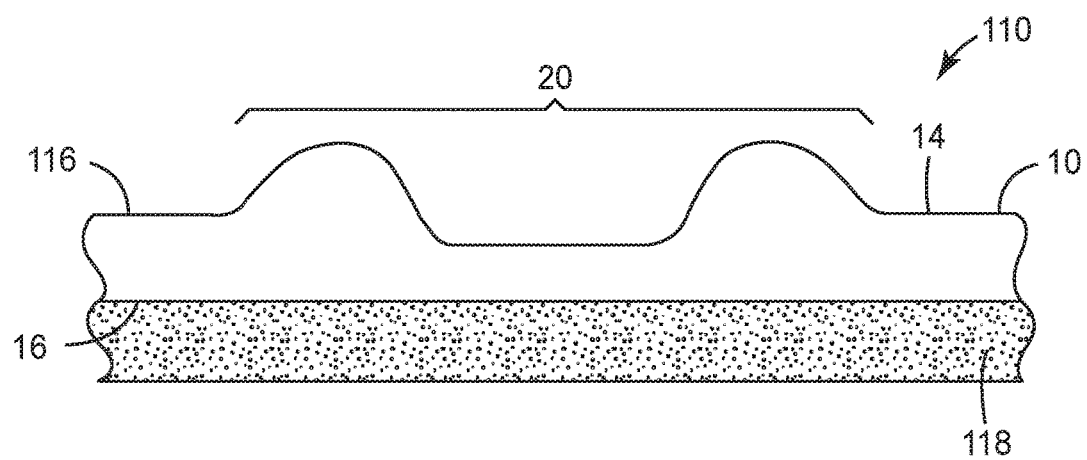
FIG. 10 is a cross-sectional view of a portion of the tape shown in FIG. 9.

FIG. 10 shows an illustrative roll of tape of the invention. Roll 110 comprises tape 112 wound upon itself into roll form on optional core 114. Tape 112 comprises backing member 116 and adhesive layer 118. As shown in FIG. 11, tape 112 comprises backing member 116 (which is an embodiment of film 10 from FIG. 1) having a first major surface 14 and opposite second major surface 16. The backing member comprises, and in this instance consists essentially of principal film 10 having a plurality of modification zones 20.

Applications

The invention can be used to manufacture tapes or sheets, which may be adhesive-backed or not, for many applications including packaging tapes, paint masking tapes, general utility or "duct" tapes, medical tapes, masking films, liners, wraps, as well as laminates with one or more additional layers including nonwovens, foams, etc.

One of the advantages of the present invention is that the tear strength of precursor films may be reduced to more useful magnitude. Typically, a principal film of the invention has one or more segments have a tear strength of about 100 g/mil-thickness or less, in some embodiments about 70 g/mil-thickness or less, and in some embodiments, about 55 g/mil-thickness or less.

Figure 11A:
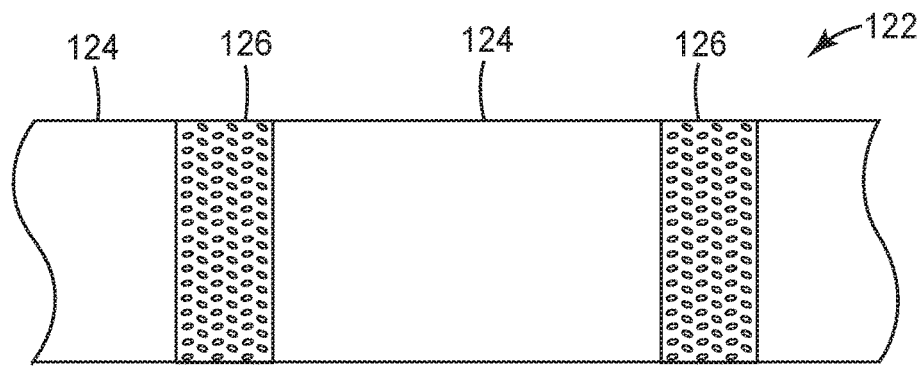
FIGS. 11A and 11B are plan views of other illustrative embodiments of sheets of the invention.
Figure 11B:
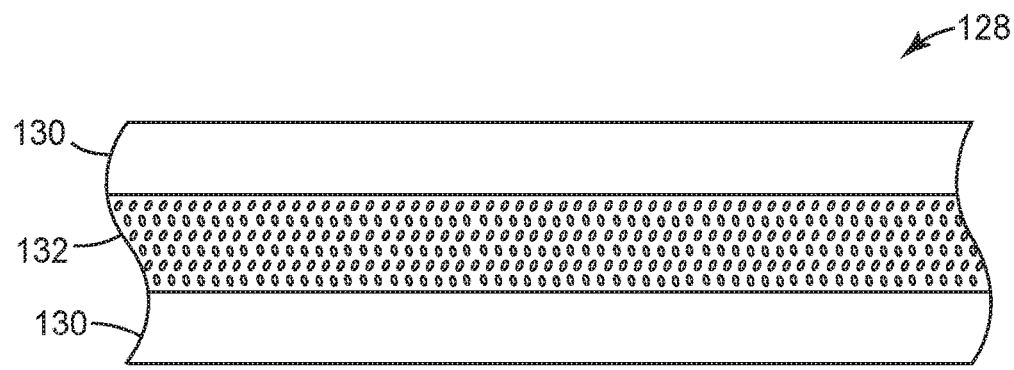

In some embodiments, such as a roll form of a principal film of the invention (e.g., a rolled bare sheet or adhesive-backed roll), the principal film consist of a single homogenous segment (i.e., a sheet comprising a uniform array of modification zones). In other embodiments, the principal film may comprise two or more segments where the segments differ in nature or even presence of modification zones. FIG. 11A shows an illustrative embodiment of a principal film of the invention wherein principal film 122 is an elongate tape comprising a plurality of segments 124 which do not have modification zones interspersed with segments 126 having modification zones in accordance with the invention. In a tape application, such configuration may be used to render the film more easily conformed or separable at discrete lengths, corresponding to segments 126. The segments may be of desired relative size and spacing. FIG. 11B shows another illustrative embodiment wherein principal film 128 is an elongate tape comprising a central segment 132 with adjacent segments 130 which do not have modification zones. In a tape configuration, such configuration may be used to render the film more easily conformable in an elongate middle portion (e.g., to bend around a wall corner). As will be understood, principal films of the invention may be made with other desired configurations of one or more first segments having an array of modification zones, and one or more other segments having no modification zones or arrays of modification zones that differ from that of the first segment(s). In this manner, principal films having varying properties such as tear strength, conformability, etc. at different locations and in different configurations may be realized in accordance with the invention.

Context of the Invention

Adhesive tapes are widely used for bonding, joining, or masking applications. An essential aspect of such adhesive tapes is the presence of a tape backing, to which self-adhesive and release coatings are affixed. It is essential to the use of an adhesive tape that the adhesive tape backings be capable of dispensing using a tool or tearing by hand to permit separation of useful lengths of tape from the roll. Especially in the area of masking tape applications, it is essential that a desired portion tape be readily torn by hand directly from the adhesive tape roll without the use of any tools or tape dispensing equipment. This enables the flexible, fastest use of the masking tape. As used herein, hand tearability refers to the ability of the tape to be torn by hand, or, hand tearability, as the ability of an average person to be able to tear a length or sheet of said backing readily with only reasonable and not undue effort. In some aspects, it is desirable to be able to apply a sharp force quickly to 'snap' the tape into a useful length.

Historically adhesive masking tapes have been constructed with paper backings to facilitate handling and application, especially tearing by hand. Because of the inherent fragility and porosity of paper tape backings, such backings must be modified by coating with one or more polymeric materials (e.g., barrier coats, binders, saturants, and the like) in order to confer desired strength, elasticity, and ability to withstand exposure to and hold out liquid coatings. Such coatings are usually applied in one or more coating operations, followed by curing or drying to fix the coating in place. This necessitates the use of a multi-step coating process line to enable the paper treatment operations followed by the applications of release and adhesive coatings to produce the desired product. Alternatively, precoating barrier coats, saturants and binders to the paper may occur in a separate operation prior to adhesive coating.

Even with the addition of barrier coats, binders and saturants, there are distinct disadvantages to use of paper backings for adhesive masking tape construction. Paper backings are inherently unstable when exposed to water or ultraviolet light, and tend to shred when used in applications requiring "wet sanding," or sanding with water, typically utilized in such industries as automotive painting. Paper backings do not tear in a straight tearing fashion, tending instead to tear at varying angles, known as slivering, and to leave shredded edges where torn. Many modern paper based adhesive masking tapes are produced using calendared or specially smoothed paper backings, which enable more uniform paint lines once removed. Still, since paper is composed of bonded paper fibers the paint lines thus formed are typically not as sharp as would be the case for a polymeric tape backing; such paper backings are usually thicker than polymeric film backings. Moreover, paper backed tapes are typically too stiff and lack sufficient elongation to permit application in smooth curved manner (i.e., bending in the x-y dimension so as to form a curved paint line on a flat surface). Typically, paper-backed tapes have an elongation of less than about 25%, and in some instances less than 15%, making them unsuitable for masking many desired configurations. Finally, the paper based masking tapes can have a relatively high production cost due to the requirement to apply the barrier, binder and saturant coatings. It should be mentioned that each such step also leads to waste either in terms of solvent removal and mitigation or in terms of thermal requirements to dry said coatings.

By contrast, the use of polymeric films for adhesive tape applications as enabled by the present invention can yield tapes offering several distinct advantages. Polymeric films, especially polyolefin based polymeric films, are typically moisture and water insensitive, have typically low profiles, high strength, good conformability and low cost. However, except for several particular types of polymeric backing, most polymeric adhesive tapes are difficult or impossible to tear hand without the use of a tool or tape dispensing blade.

There are several examples of polymeric films which do exhibit good hand tearability, yet are not suitable for certain applications especially for masking applications. Cast films such as cellulose acetate used in SCOTCH™ tape (3M Company) can be easily torn by hand, but are moisture sensitive and can swell and curl when exposed to water. Other adhesive tape backings based on polyvinyl chloride cannot be torn easily without stretching and deforming, and are in addition costly to manufacture.

Other polymeric films such as polyolefins or polyesters are based on commodity polymer resins and hence can have low cost. However such polymeric films are very difficult to tear by hand. In some cases such films can be rendered more hand tearable by choice of a suitable film making process such as biaxial orientation and/or incorporation of multiple layers; especially in the latter case, the films have a tendency to delaminate or experience layer separation, particularly upon removal in applications such as masking and protection. This is unacceptable to users who require an adhesive tape be cleanly and readily removable after use.

The principal films provided by the present invention uniquely provide a desired blend of attributes, including:
Convenient hand tearability
Inherent moisture and water resistance
Resistance to slivering
Straight-line tear propagation
Low profile
High conformability, that is, ability to be formed into a radius with a continuous flat outer or convex edge due to both the inherent elongatability of polymeric films and the additional 'give' flame impinged films have due to the thinned central portions.

Low cost
do not require use of barrier, binder or saturation coatings
The combination of superior properties provided by principal films of the invention as compared to many previously known tape backing materials is shown generally in the following table.

| Property | Paper | Plastic 1 | Plastic 2 | Plastic 3 | Invention |
|---|---|---|---|---|---|
| Hand tearability | Yes | Yes | No | Yes | Yes |
| Tear straightness | No | No | No | No | Yes |
| Slivering resistant | No | No | Yes | Yes | Yes |
| 'Snap' tearable | Yes | No | No | Some | Yes |
| Water resistance | No | Some | Yes | Yes | Yes |
| Delamination | Some | Some | Some | Some | No |
| Low profile | No | Yes | Yes | Yes | Yes |
| Conformability | Some | Some | Some | Yes | Yes |
| Low cost | No | No | Yes | Yes | Yes |
| Barrier, binder | Yes | No | No | No | No |

Plastic 1 - PVC or cellulose acetate type; cast. Exs: 3M ™ SCOTCH ® Fineline (PVC) or SCOTCH ® MAGIC Tape (acetate)
Plastic 2 - BOPP or polyester (BOPET) Exs: Box sealing tape (BOPP); polyester bundling tape.
Plastic 3 - 3M ™ SCOTCH ® MultiTask tape.

EXAMPLES

The invention may be further understood with reference to the following illustrative examples.
Test Methods
The following test methods were used.
ASTM D3759 Tensile Modulus
The tensile modulus of BOPP film was measured on an Alliance RT/5 MTS tensile testing machine in accordance with ASTM D3759. A 1 inch wide, 6 inch long sample was cut out along the traverse direction of the test film. The caliper of each sample was measured at three different points along the strip and recorded as an average of the three measurements. The specimen was then clamped in the grips of the testing machine with a gauge separation of 4 inches. The long axis of the specimen was carefully aligned with an imaginary line running between centers of the grips. No more tension was applied to the specimen during clamping than was necessary to remove slack. The cross head was then moved at 12 inches/min until the specimen ruptures. The tensile modulus was recorded and normalized with caliper. Five replicas were run for each film.
Constrained Thermally Induced Elastic Recovery Stress—B1
The thermally induced elastic recovery stress of test specimens were measured using a TA Instrument model RSA G2 Dynamic Mechanical Analyzer (TA Instruments, New Castle, Del.) in tensile mode.
Test specimens were cut along the major axis of film orientation for measurements; practically for sequentially stretched BOPP this means the transverse film direction (TD) at a dimension of 6.2 mm in the MD and 25 mm in the TD. Specimens were clamped with a fixed strain of 1% so that the testing strip was positioned flat and even. Specimens were first conditioned at 30° C. for 2 min, and then subjected to heating from 30° C. to 190° C. at the rate of 3° C./min. Under these conditions of fixed clamping, upon heating an axial retractive or elastic recovery force is generated with increasing temperature as the crystalline or other hard phase segments of the film soften and melt. In the tensile mode of the DMA, the axial force at a fixed strain reflects the recovering stress released during the heating. The plot of normalized stress over temperature shows the stress change during the elastic recovery caused by heating. The normalized stress is obtained by normalizing axial force by the area of film cross section. Because the thermally induced recovery stress is exerted on the specimen clamps in the direction of strain, the values reported are negative (that is, test specimens exert a pull or tensile retractive force on the force transducers to which the clips are affixed).

Figure 8:
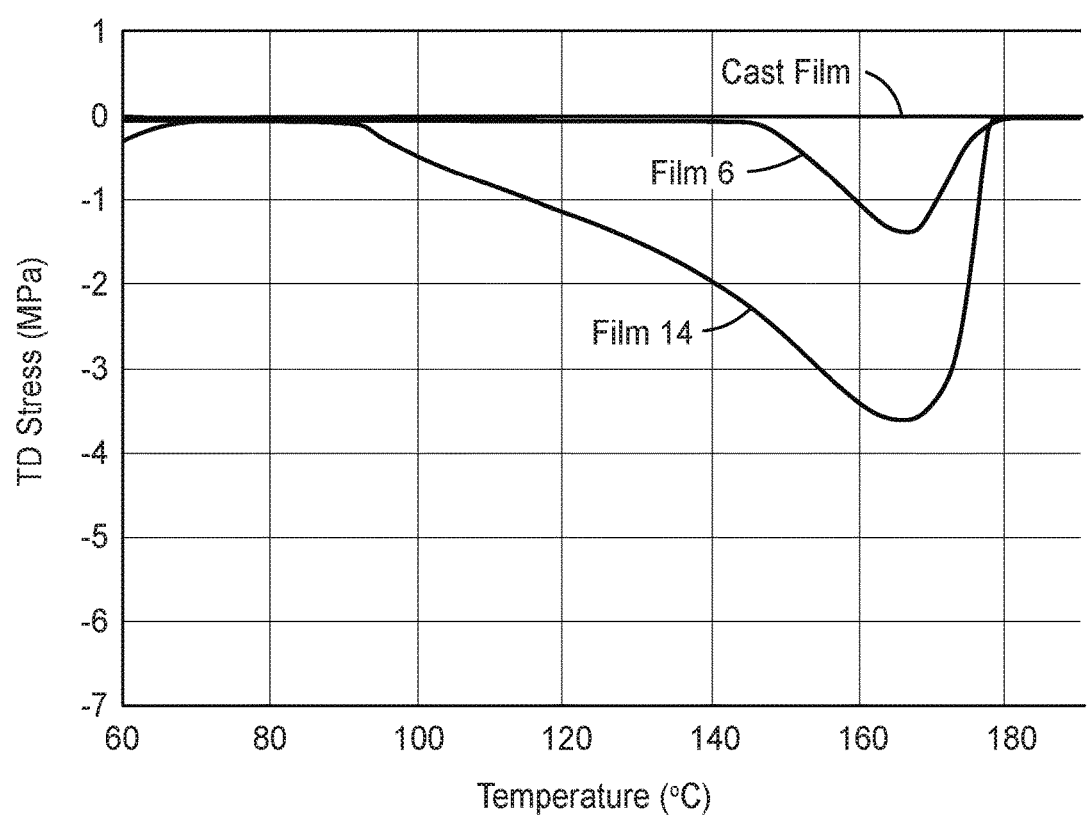
FIG. 8 is a graph showing constrained elastic recovery stress in select films.
Figure 9:
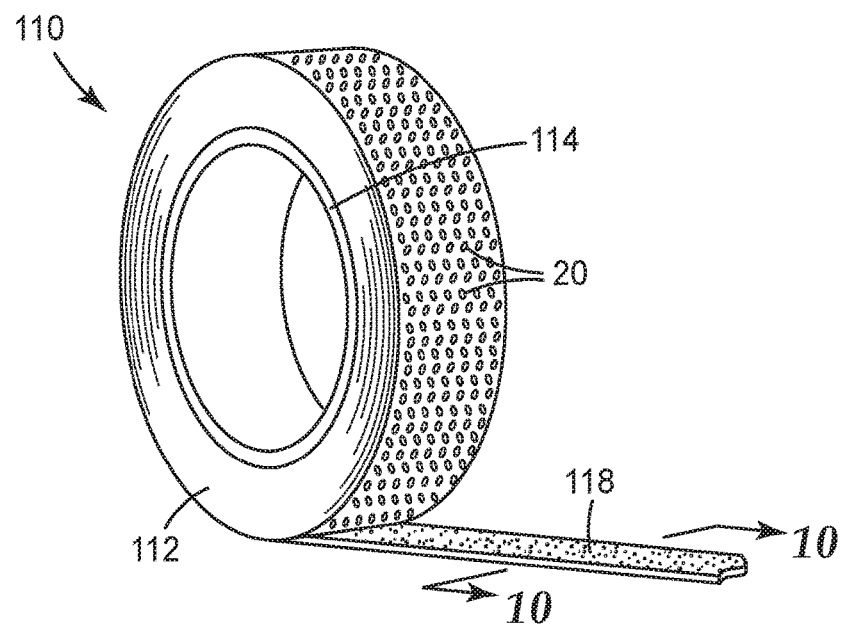
FIG. 9 is a perspective view of an illustrative embodiment of a roll of tape of the invention.

FIG. 8 is a plot of the constrained elastic recovery stress in the transverse (TD) direction of select Films from the Examples (prior to flame impingement).

ASTM D2732-14 & D2732—Constrained Thermally Induced Elastic Recovery Stress In TD (Non-FIP Films)—B2

The thermally induced elastic recovery of test specimens was measured using a Perbix Thermal Shrinkage Analysis Instrument (Perbix Machine Company, Brooklyn Park, Minn.) fixed with a high accuracy Keyence dimensional tracking system (CCD micrometer, LS-7001 and CCD LS-7030T) to detect dimensional changes in the film prior to thermal processing. Test specimens were cut along the major axis of film orientation for measurements; practically for sequentially stretched BOPP this means the transverse film direction (TD) at a dimension of 25.4 mm in the MD and 228.6 mm in the TD. Specimens were clamped using tension from a 1.5 g weight so that the testing strip was positioned in a flat and even manner. Specimens were first conditioned at 25° C. for a minimum of 5 mins. The films were placed in clips on either end of the film specimen and then subjected to heating in an oven at 115° C. for 5 mins and then were allowed to cool to 25° C. for 2 mins. As the sample was heated and cooled, the sample length was measured via the Keyence system to determine the length change over time. Upon heating, an axial retractive or elastic recovery force is generated as the crystalline or other hard phase segments of the film soften and melt. This results in a reduction (thermal shrinkage) or increase (thermal expansion) in the length of the specimen in the TD. Data reported are taken from the first plateau region after at least 1 minute at 115° C. Because the thermally induced elastic recovery is exerted on the specimen clamps in the direction of strain, the values reported are negative due to shrinkage (that is, test specimens exert a tensile retractive force on the clamps). Values are reported as positive if due to thermal expansion.

ASTM D1922 Elmendorf (Un-Notched) Tear Test, Thermally Processed Films

The hand tearing ability of films subjected to the differential thermal process was measured using an initiation tear force test of the BOPP films in the transverse direction. The force to initiate tearing was measured using a Thwing-Albert Electronic Pro Elemendorf Tear Tester. The tear tests were conducted on un-notched 2.5"×2.5" (63 mm×63 mm) film specimens, with five replicates for each and utilizing a 1600 g pendulum weight. The test method is based on the Elemendorf Propagation Force Tear test—ASTM D1922. The average of five replicates is reported in grams force to induce tear.

Orientation Process

Finished sheets of about 30 to about 40 microns in thickness of the indicated polymers were formed and wound onto a roll. The process conditions used are presented in Table 1.

Preparation of Films 1 and 2

A simultaneously biaxially oriented polypropylene film was prepared using the linear motor based simultaneous stretching process described in U.S. Pat. Nos. 4,675,582; 4,825,111; 4,853,602; 5,036,262; 5,051,225; and 5,072,493. The stretching equipment was built by Bruckner Maschinenbrau, Seigsdorf, Germany. Polymers, described in Table 2, were used.

Resins A, B, H, and I were extruded; single screw extrusion for each layer was used to provide a stable melt having a melt temperature of about 227 to 260° C. for each layer. Polymers listed in Table 2 were used in each respective layer as indicated, so that the film had distinct resins in each of the three layers. The polymer melt was extruded through a slot die and cast onto a water-cooled chrome-plated steel casting wheel rotating at about 18.5 meters per minute and which was controlled to about 35° C. using closed loop internal water circulation and by immersing the casting wheel in a water bath, the water being about 18° C. The cast sheet had a trimmed width of about 83 to 86 cm and a thickness of about 0.185 cm. The cast sheet was passed through a bank of IR heaters set to about 440° C. to pre-heat the cast film to approximately 70° C., prior to stretching in the tenter oven. The cast and pre-heated film was then simultaneously stretched in longitudinal (MD) and transverse (TD) directions to produce biaxially oriented film. For this 0.038 mm finished film, the pre-heat section of the oven was adjusted to provide a pre-heated film with a temperature of about 150 to 160° C. The tenter oven temperature set-points used during the pre-heat sections were set nominally to about 170° C. in the preheat zones, to 142° C. in the stretching zones, and to 165° C. in the annealing sections. The final total area stretching ratio was nominally about 50 to 1 after nominal relaxation in annealing. The MD ratio was about 7.5/1 and the TD ratio was about 7.3/1. The stretched film was about 0.038 mm thick and the trimmed width was about 523 cm. The film was corona treated with a Softal corona treater to provide one surface with about 38 dynes surface tension. Wind-up speed was nominally about 140 meters/minute. Conditions were adjusted so as to attain the desired film thickness of 0.038 mm. The film was slit (Offline) in the machine direction into useful sample widths for testing and/or further processing using a razor cutting blade equipped with fresh blades. All cited temperatures, rates, speeds, ratios, dimensions, etc., are nominal and approximate.

Preparation of Films 3-16

Resins—listed in Table 1 were coextruded using a 3 layer extrusion die fitted to a single screw extruder and formed into a sheet by casting onto a casting drum set at a temperature ranging 32 to 64° C. The cast sheet was then sequentially oriented by first passing over a set of heated differentially driven rollers to a stretch ratio in the machine direction (MDO) of about 5 times, then fixed along the longitudinal edges by a series of spring loaded grips and stretched in the transverse direction (TDO) about 9 times. The thus-formed biaxially oriented sheet was collected in a continuous roll for further processing.

TABLE 1

| | | | | | | | Seq. | Seq. | Simul. | Simul. | Simul. |
|---|---|---|---|---|---|---|---|---|---|---|---|
| | Stretch | | | | | Casting | MDO | TDO | Pre-heat | Stretch | Anneal |
| | (Seq. or | | Resin** | | | Temp/s | Temp/s | Temp/s | Temp/s | Temp/s | Temp/s |
| Sample | Simul.)* | 1 | 2 | 3 | (° C.) | (° C.) | (° C.) | (° C.) | (° C.) | (° C.) |
| Film 1 | Simul. (7x7) | A | B | I | 35 | — | — | 170 | 142 | 165 |

TABLE 1-continued

Film Production Conditions

| Sample | Stretch (Seq. or Simul.)* | Resin** 1 | 2 | 3 | Casting Temp/s (°C.) | Seq. MDO Temp/s (°C.) | Seq. TDO Temp/s (°C.) | Simul. Pre-heat Temp/s (°C.) | Simul. Stretch Temp/s (°C.) | Simul. Anneal Temp/s (°C.) |
|---|---|---|---|---|---|---|---|---|---|---|
| Film 2 | Simul. (7x7) | A | B | H | 35 | — | — | 170 | 142 | 165 |
| Film 3 | Seq. (5x9) | D | E | — | 60, 64 | 136 | 165 | — | — | — |
| Film 4 | Seq. (5x9) | D | — | — | 38 | 95 | 158 | — | — | — |
| Film 5 | Seq. (5x9) | D | C | F | 32 | 108 | 165 | — | — | — |
| Film 6 | Seq. (5x9) | D | — | — | 60 | 95 | 161 | — | — | — |
| Film 7 | Seq. (5x9) | D | — | — | 60 | 120 | 160 | — | — | — |
| Film 8 | Seq. (5x9) | D | I | — | 60 | 95 | 162 | — | — | — |
| Film 9 | Seq. (5x9) | D | A | — | 60 | 95 | 162 | — | — | — |
| Film 10 | Seq. (5x9) | D | B | — | 38 | 101 | 162 | — | — | — |
| Film 11 | Seq. (5x9) | C | G | — | 63 | 120 | 166 | — | — | — |
| Film 12 | Seq. (5x9) | D | E | — | 60 | 120 | 160 | — | — | — |
| Film 13 | Seq. (5x9) | I | — | — | 25 | 120 | 163 | — | — | — |
| Film 14 | Seq. (5x9) | C | — | — | 25 | 120 | 165 | — | — | — |
| Film 15 | Seq. (5x9) | C | — | — | 25 | 120 | 166 | — | — | — |
| Film 16 | Seq. (5x9) | C | D | — | 32 | 116 | 166 | — | — | — |

*"Seq." means sequentially biaxially oriented (stretched) polymer film processing (typically at 5x for machine direction orientation, MDO and 9x for transverse direction orientation, TDO); "Simul" means simultaneously biaxially oriented (stretched) polymer film processing (typically 7x7 MDO/TDO).
**Resins:
A = Schulman Polybatch DUL 3636 DP20 polyolefin blend,
B = ExxonMobil 9122 Polypropylene Random Copolymer (2.5% co-ethylene),
C = ExxonMobil 4792 Polypropylene mini-random copolymer (0.5% co-ethylene),
D = Total 5571 High Impact Polypropylene Copolymer,
E = Mayzo Corporation MPM1114 Beta Nucleant Polypropylene masterbatch,
F = Clariant PE54642563 polyolefin blend,
G = Dow Infuse 9507 Olefin Block Copolymer,
H = Total 3371 polypropylene.
I = ExxonMobil 4712 E1 polypropylene (0.5% co-ethylene).

Flame Impingement Differential Heating Process

The following flame impingement process was used to carry out differential heating in the Examples.

The flame impingement shown in FIG. 3 of U.S. Pat. No. 7,037,100 was used with the following operating conditions. Compressed air was premixed with a natural gas fuel (having a stoichiometric ratio of 9.7:1 and a heat content of 37.7 kJ/L) in a venturi mixer (from Flynn Burner Corporation, Mooresville, N.C.) to form a combustible mixture. The flows of air and natural gas were measured with thermal mass flow meters (from Fox Thermal Instrument, Inc., Marina, Calif.), and the flow rates of natural gas and air were controlled with servo-motor-driven needle valves (from Flynn Burner Corporation). All flows were adjusted to result in a flame equivalence ratio of 0.96 (air:fuel ratio of 10.1:1) and a normalized power of 1635 W/cm$^2$ of burner area (14,140 Btu/hr-in. of burner length). The combustible mixture passed through piping to a ribbon burner of the type described in U.S. Pat. No. 7,635,264, comprising a 30.5 cm long×1 cm wide, 6-port corrugated stainless steel ribbon mounted in a water-cooled aluminum housing (from Flynn Burner Corporation).

The burner was mounted adjacent to a 35.5 cm diameter, 46 cm face-width, chilled steel backing roll (from American Roller Company, Union Grove, Wis.). The temperature of the backing roll was controlled by a 240 L/min recirculating flow of water at a temperature of 10° C. The face of the backing roll was plated with 0.5 mm of copper, the central 29 cm of the face of the roll was etched with the perforation pattern shown in FIG. 6 of U.S. Pat. No. 7,037,100, and then the entire face was coated with 0.01 mm of chrome (by Custom Etch Rolls Inc., New Castle, Pa.). Filtered, compressed air at a pressure of about 35 kPa/m$^2$ (5 psig) was blown onto the backing roll to controllably reduce the amount of water condensation on the central, patterned portion of the backing roll. The distance between the face of the burner housing and the face of the backing roll, which is the D distance in FIG. 4 of U.S. Pat. No. 7,037,100, was adjusted to 16 mm. The E distance in FIG. 4 was equal to 3 mm.

The indicated films were guided by idler rolls to wrap around the chilled backing roll and over the patterned portion of the roll and passed through the flame impingement process at a speed of 60 m/min. The upstream and downstream tension of the film was maintained at approximately 2.2 N/lineal cm. To insure intimate contact between the polypropylene film and the chilled backing roll, a 10 cm diameter, 40 cm face-width inbound nip roll covered with 6 mm of VN 110 VITON™ elastomer (from American Roller Company), was located approximately 45 degrees relative to the burner on the inbound side of the chilled backing roll. Positioned between the nip roll and the burner was a water-cooled shield maintained at a temperature of 38° C. with recirculating water. The nip roll-to-backing roll contact pressure was maintained at approximately 50 N/lineal cm.

Flame Impingement Differential Heating Process For Comparative Examples C2 and C3

Standard commercially available sequentially biaxially oriented polypropylene having a length-direction orientation ratio of 5:1 and a transverse-direction orientation ratio of 9:1 was passed through the flame impingement process as described for the Examples with the following exceptions: flame power was 578 W/cm$^2$ (5000 Btu/hr-in.); equivalence ratio was 0.97 (air:fuel ratio of 10.0:1); the backing roll temperature was held at 38° C.; no compressed air was blown onto the backing roll to control condensation; and the distance between the ribbon burner housing and the backing roll was 12 mm. The film was passed through the flame impingement process at speeds between 25 and 30 m/min.

At a film speed of 30 m/min, no rims were visible on the processed film. At a film speed of 25 m/min, all perforation zones on the processed film were open, that is, had a "c" dimension of zero as shown in FIG. 5. Thus, with commercially available BOPP films, there is a very small flame-impingement processing window for generating films that have rims, but without open perforations. For such standard BOPP, it would be difficult, if not impossible, to consistently perform a process that generated films with rims, but without open holes, in a manufacturing environment. In addition, those BOPP films with rims, but without holes (Comparative Examples C2 and C3) were extremely non-uniform in visual appearance, having dimensions "a" and "c" that varied greatly between individual zones of thermal modification. Such non-uniform materials would be impossible to convert into, for example, functional adhesive tapes. Comparative Examples C2 and C3 also do not have hand-tear properties. The Comparative Examples cannot be readily torn by had unless a defect, such as a scissor cut, is introduced along one edge of the processed BOPP. Thus, tear initiation is high for these samples, in contrast to the easy tear initiation obtained with BOPPs processed by flame impingement that are disclosed here. The Comparative Examples also do not tear straight, but rather tear at any random angle, in contrast to the mostly straight-line tear obtained with the specialty BOPPS disclosed here.

NOTE: The conditions described above represent the optimal conditions for generating any type of standard BOPP with rims, but without holes. Any other combination of film speeds, flame powers, gaps, and backing-roll temperatures that we tried had such non-uniform thermal modification that no further testing was possible.

The results of testing of Examples and Comparative Examples are shown in Table 2.

TABLE 2

Film Properties, examples and counter examples.

| Sample | Example | Tear force, TD (gf/mil) | Shrink force, peak in TD (MPa) | AST Shrinkage, TD (%) | Tensile Modulus, TD (MPa) | Tensile strength at break, MD (MPa) | Elongation at break, MD (%) | Open (Y/N) |
|---|---|---|---|---|---|---|---|---|
| Film 1 | 1 | 44 ± 16 | — | — | — | 6.75 | 29 | N |
| Film 1# | | — | — | −0.26 ± 0.03 | — | 12.48 | 75 | — |
| Film 2 | 2 | 22 ± 3 | — | — | — | 9.81 | 20 | N |
| Film 2# | | — | — | −0.13 ± 0.02 | — | 15.51 | 80 | — |
| Film 3 | 3 | 52 ± 14 | — | — | — | 8.70 | 50 | N |
| Film 3# | | — | — | −0.18 ± 0.07 | — | 22.08 | 137 | — |
| Film 4 | 4 | 42 ± 8 | — | — | — | 7.18 | 34 | N |
| Film 4# | | — | −1.470 | +0.12 ± 0.06 | — | 21.64 | 72 | — |
| Film 5 | 5 | 35 ± 8 | — | — | — | 7.18 | 61 | N |
| Film 5# | | — | — | +0.44 ± 0.22 | 2176 | 19.58 | 114 | — |
| Film 6 | 6 | 70 ± 14 | — | — | — | — | — | N |
| Film 6# | | — | −1.274 | — | 1930 | — | — | — |
| Film 7 | 7 | — | — | — | — | — | — | N |
| Film 7# | | — | — | — | 1735 | — | — | — |
| Film 8 | 8 | 94 ± 9 | — | — | — | — | — | N |
| Film 8# | | — | −1.434 | — | 2165 | — | — | — |
| Film 9 | 9 | 61 ± 5 | — | — | — | — | — | N |
| Film 9# | | — | −0.976 | — | 1800 | — | — | — |
| Film 10 | 10 | 91 ± 21 | — | — | — | — | — | N |
| Film 10# | | — | −1.490 | — | 2110 | — | — | — |
| Film 11 | 11 | 47 ± 1* | — | — | — | 6.51 | 52 | N |
| Film 11# | | — | — | +0.12 ± 0.23 | — | 14.48 | 145 | — |
| Film 12 | 12 | — | — | — | — | — | — | N |
| Film 12# | | — | −1.649 | — | 1830 | — | — | — |
| Film 13 | C1 | 84 ± 23 | — | — | — | — | — | Y |
| Film 13# | | — | −2.712 | — | 4200 | — | — | — |
| Film 14 26 m/min | C2 | 76 ± 16 | — | — | — | 13.04 | 40 | N |
| Film 14 28 m/min | C3 | 96 ± 8* | — | — | — | 27.55 | 144 | N |
| Film 14# | | — | −2.646 | −1.30 ± 0.03 | 3765 | 31.13 | 154 | — |
| Film 15 | C4 | 81 ± 23 | — | — | — | — | — | Y |
| Film 15# | | — | −3.589 | — | 4137 | — | — | — |

TABLE 2-continued

Film Properties, examples and counter examples.

| Sample | Example | Tear force, TD (gf/mil) | Shrink force, peak in TD (MPa) | AST Shrinkage, TD (%) | Tensile Modulus, TD (MPa) | Tensile strength at break, MD (MPa) | Elongation at break, MD (%) | Open (Y/N) |
|---|---|---|---|---|---|---|---|---|
| Film 16 | C5 | 173 ± 30 | — | — | — | — | — | Y |
| Film 16# | | — | −2.130 | — | 2668 | — | — | — |

*Indicates that not all replicates could be torn.
Indicates the Film is the precursor film.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom. The complete disclosure of all patents, patent documents, and publications cited herein are incorporated by reference.

What is claimed is:

1. An article comprising a principal film, wherein:
   (a) the principal film comprises a first polymeric component comprising one or more polymers; and
   (b) the principal film has: (1) first and second major faces; (2) a land portion wherein the principal film is capable of thermally-induced elastic recovery; and (3) one or more modification zones, each modification zone comprising a central portion and a rim portion surrounding the central portion and being surrounded by land portion, wherein the average thickness of each rim portion is greater than the average thickness of the land portion surrounding the modification zone, the average thickness of each central portion is less than the average thickness of the land portion surrounding the modification zone and is greater than zero, and wherein one or more segments of the principal film have a tear strength of about 100 $g_f$/mil-thickness or less.

2. The article of claim 1 wherein the average thickness of the land portion of the principal film is about 0.5 to about 3 mils (13 to 75 microns).

3. The article of claim 1 wherein the land portion of the principal film exhibits a shrinkage response of not more than 1% when evaluated according to ASTM D2732.

4. The article of claim 1 wherein the land portion of the principal film exhibits a shrinkage response of about 0.3% or less when evaluated according to ASTM D2732.

5. The article of claim 1 wherein one or more segments of the principal film have a tear strength of about 70 $g_f$/mil-thickness or less.

6. The article of claim 1 wherein one or more segments of the principal film have a tear strength of about 55 $g_f$/mil-thickness or less.

7. The article of claim 1 wherein the first polymeric component comprises one or more polyolefin polymers.

8. The article of claim 1 wherein the first polymeric component is selected from the group consisting of polyolefin, polyester, polystyrene, polyamide, or combinations thereof.

9. The article of claim 1 wherein the land portion of the principal film is biaxially oriented.

10. The article of claim 1 wherein that land portion of the principal film is uniaxially oriented.

11. The article of claim 1 wherein the principal film is a monolayer.

12. The article of claim 1 wherein the principal film is multilayer.

13. The article of claim 1 wherein the principal film is less highly oriented in the rim portion than in the surrounding land portion.

14. The article of claim 1 wherein the modification zones are arranged in an ordered array.

15. The article of claim 1 wherein the modification zones are arranged in a random manner.

16. The article of claim 1 wherein the modification zones have similar individual configuration.

17. The article of claim 1 wherein the modification zones have varied individual configuration.

18. The article of claim 1 wherein the principal film has first segment having a first array of a plurality of modification zones and a second segment having a second array of a plurality of modification zones wherein the first array differs from the second array in one or more characteristics.

19. The article of claim 18 wherein the characteristics are selected from the group consisting of the following: (1) average distance between adjacent modification zones, (2) shape of modification zones, (3) dimension of modification zones, and (4) average thickness of rim portions.

20. The article of claim 1 wherein the principal film has a first segment having an array of a plurality of modification zones and a second segment which is free of modification zones.

21. The article of claim 1 further comprising an adhesive layer.

22. The article of claim 21 wherein the adhesive layer is normally tacky, pressure sensitive adhesive.

23. The article of claim 1 wherein the front face of the backing member is free of release coating.

24. The article of claim 1 further comprising a release coating on at least a portion of the front face of the backing member.

* * * * *

UNITED STATES PATENT AND TRADEMARK OFFICE
CERTIFICATE OF CORRECTION

PATENT NO. : 10,427,365 B2
APPLICATION NO. : 15/538445
DATED : October 1, 2019
INVENTOR(S) : Patrick Hager et al.

It is certified that error appears in the above-identified patent and that said Letters Patent is hereby corrected as shown below:

In the Specification

Column 17
Line 29, delete "Polm" and insert --Polym--, therefor.

Column 22
Line 19, delete "3M ™ SCOTCH ®" and insert --3M™ SCOTCH®--, therefor.
Line 20, delete "SCOTCH ®" and insert --SCOTCH®--, therefor.
Line 22, delete "3M ™ SCOTCH ®" and insert --3M™ SCOTCH®--, therefor.

Column 23
Line 45, delete "Elemendorf" and insert --Elmendorf--, therefor.
Lines 48-49, delete "Elemendorf" and insert --Elmendorf--, therefor.

Column 24
Lines 6-7, delete "Maschinenbrau, Seigsdorf," and insert --Maschinenbau, Siegsdorf,--, therefor.
Line 40, delete "(Offline)" and insert --(offline)--, therefor.

Signed and Sealed this
Twenty-sixth Day of May, 2020

Andrei Iancu
*Director of the United States Patent and Trademark Office*